US012739050B2

(12) United States Patent
Jones

(10) Patent No.: US 12,739,050 B2
(45) Date of Patent: Sep. 15, 2026

(54) CONTROLLING A MULTI-RAIL SWITCH IN A SPACE-DIVISION MULTIPLEXING OPTICAL NETWORK

(71) Applicant: Ciena Corporation, Hanover, MD (US)

(72) Inventor: Kevan Peter Jones, Ottawa (CA)

(73) Assignee: Ciena Corporation, Hanover, MD (US)

( * ) Notice: Subject to any disclaimer, the term of this patent is extended or adjusted under 35 U.S.C. 154(b) by 212 days.

(21) Appl. No.: 18/796,074

(22) Filed: Aug. 6, 2024

(65) Prior Publication Data

US 2026/0046054 A1 Feb. 12, 2026

(51) Int. Cl.
*H04J 14/00* (2006.01)
*H04Q 11/00* (2006.01)

(52) U.S. Cl.
CPC .......... *H04J 14/05* (2023.08); *H04Q 11/0005* (2013.01)

(58) Field of Classification Search
CPC ................. H04J 14/05; H04Q 11/0005; H04Q 2011/0081
USPC ............................................................ 398/55
See application file for complete search history.

(56) References Cited

U.S. PATENT DOCUMENTS 6,166,851 A 12/2000 Flintham et al.
6,208,441 B1 3/2001 Jones et al.
6,275,331 B1 8/2001 Jones et al.
6,281,998 B1 8/2001 Jones et al.
6,310,994 B1 10/2001 Jones et al.
6,438,287 B1 8/2002 Jones
6,542,233 B1 4/2003 Bray et al.
6,621,621 B1 9/2003 Jones et al.
6,646,795 B1 11/2003 Jones et al.
6,751,414 B1 6/2004 Davies et al.
(Continued)

FOREIGN PATENT DOCUMENTS

CN 115499728 A * 12/2022 ......... H04Q 11/0005
EP 1278324 A3 1/2003
(Continued)

OTHER PUBLICATIONS

NTT, World's first SDM long-distance optical transmission experiment of up to 455 terabits per second in the terrestrial field environment, Dec. 2024, NTT, pp. 1-7. (Year: 2024).*
(Continued)

*Primary Examiner* — Amritbir K Sandhu
(74) *Attorney, Agent, or Firm* — Baratta Law PLLC; Lawrence A. Baratta, Jr.

(57) ABSTRACT

Systems and methods are provided for configuring routes through a multi-rail system. A network element in a Space Division Multiplexed (SDM) optical network includes a first switch connected to a plurality of rails in a west direction relative to the network element; a second switch connected to the plurality of rails in an east direction relative to the network element; and a plurality of optical components, located between and connected to the first switch and the second switch, each optical component supporting a rail of the plurality of rails where each rail includes a fiber path being amplified in the SDM optical network, wherein each of the first switch and the second switch are configured to selectively switch individual rails of the plurality of rails to different optical components of the plurality of optical components.

20 Claims, 12 Drawing Sheets

(56) References Cited

U.S. PATENT DOCUMENTS

| | | | | |
|---|---|---|---|---|
| 7,711,270 | B2 * | 5/2010 | Ooi | H04B 10/032 398/175 |
| 7,843,630 | B2 | 11/2010 | Van Schyndel et al. | |
| 8,090,259 | B2 | 1/2012 | Leclair et al. | |
| 8,526,812 | B2 | 9/2013 | Solheim et al. | |
| 8,542,992 | B2 | 9/2013 | Jones et al. | |
| 8,670,664 | B2 | 3/2014 | Leclair et al. | |
| 9,742,489 | B2 * | 8/2017 | Yin | H04B 10/0795 |
| 10,027,435 | B2 | 7/2018 | Guy et al. | |
| 10,368,149 | B2 | 7/2019 | Jones et al. | |
| 10,644,824 | B1 | 5/2020 | Grammel et al. | |
| 10,985,859 | B2 | 4/2021 | Jones | |
| 11,063,683 | B1 * | 7/2021 | Jones | H04J 14/0219 |
| 11,272,269 | B1 | 3/2022 | Archambault et al. | |
| 11,411,365 | B2 | 8/2022 | Boertjes et al. | |
| 11,927,807 | B2 | 3/2024 | Keys et al. | |
| 2003/0151799 | A1 | 8/2003 | Wight et al. | |
| 2004/0028056 | A1 * | 2/2004 | Mitchem | H04Q 11/0407 370/395.21 |
| 2004/0052526 | A1 | 3/2004 | Jones et al. | |
| 2004/0100684 | A1 | 5/2004 | Jones et al. | |
| 2004/0208504 | A1 | 10/2004 | Solheim et al. | |
| 2011/0211826 | A1 | 9/2011 | Leclair et al. | |
| 2015/0171964 | A1 * | 6/2015 | Rapp | H04B 10/2581 398/58 |
| 2015/0365317 | A1 * | 12/2015 | Wang | G02B 6/02076 398/16 |
| 2016/0182982 | A1 | 6/2016 | Schmidtke et al. | |
| 2019/0007155 | A1 * | 1/2019 | Grammel | H04J 14/0275 |
| 2020/0073054 | A1 * | 3/2020 | Yang | G02B 6/29311 |
| 2020/0351005 | A1 | 11/2020 | Jones | |
| 2020/0374025 | A1 | 11/2020 | Jones | |
| 2022/0183188 | A1 | 6/2022 | Lee et al. | |
| 2023/0136513 | A1 | 5/2023 | Jones et al. | |
| 2024/0187123 | A1 | 6/2024 | Jones et al. | |

FOREIGN PATENT DOCUMENTS

| | | | | | |
|---|---|---|---|---|---|
| EP | 4042608 | B1 | | 7/2023 | |
| JP | H10304406 | A | * | 11/1998 | H04J 14/0228 |
| JP | 2011181927 | A | | 9/2011 | |
| WO | 1990002105 | A1 | | 3/1990 | |
| WO | 2002039552 | A2 | | 5/2002 | |

OTHER PUBLICATIONS

Nov. 24, 2025, International Search Report and Written Opinion for International Patent Application No. PCT/US2025/039689.

* cited by examiner

R1 R2 R3 R4
16 16 18a 18b 16 16
R1 R2 R3 R4
12a 12b 14c 12c 12d
14a 14b 14d 14e

10

10
22
R1 R2 R3 R4
16
R1 R2 R3 R4
12a 12b 12c 12d

152

OPERATE A PLURALITY OF RAILS IN A WEST DIRECTION AND AN EAST DIRECTION, EACH RELATIVE TO THE NETWORK ELEMENT, WHEREIN THE NETWORK ELEMENT IS CONFIGURED TO AMPLIFY EACH RAIL OF THE PLURALITY OF RAILS VIA A PLURALITY OF AMPLIFIERS

154

SELECTIVELY SWITCH INDIVIDUAL RAILS OF THE PLURALITY OF RAILS TO DIFFERENT AMPLIFIERS OF THE PLURALITY OF AMPLIFIERS, THEREBY SEPARATING A PHYSICAL PATH OF THE PLURALITY OF RAILS FROM A LOGICAL PATH

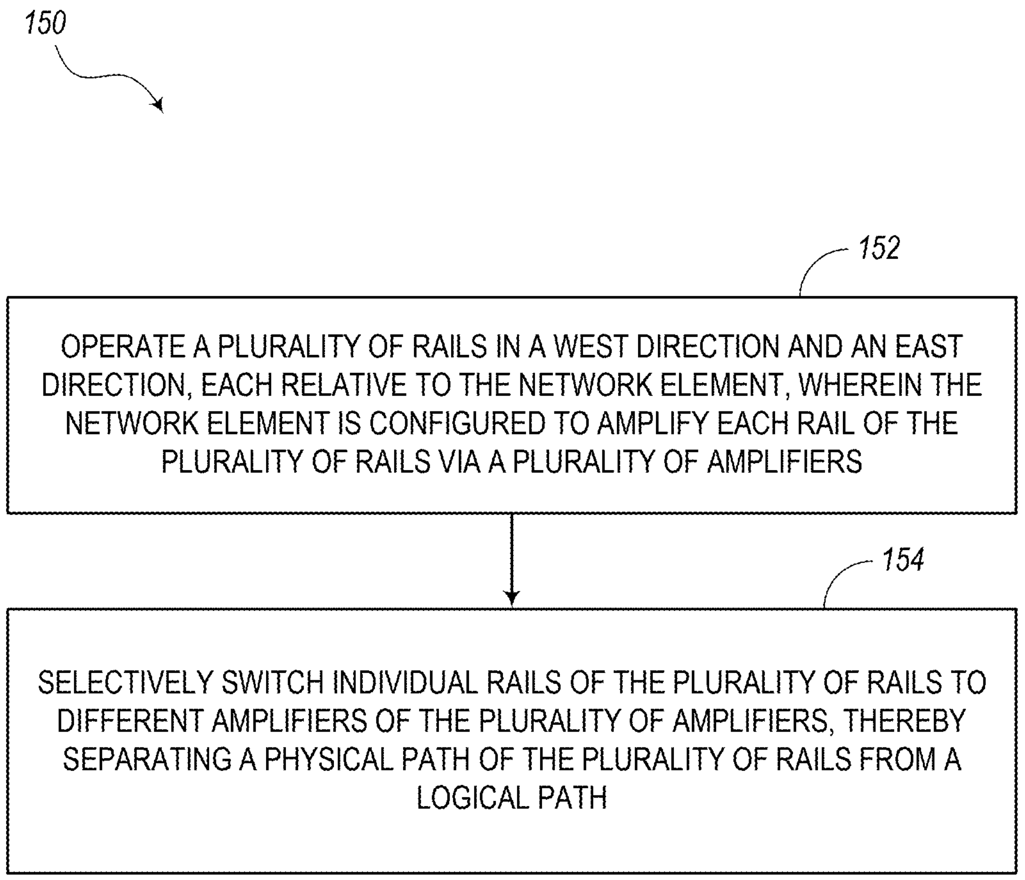

FIG. 12

CONTROLLING A MULTI-RAIL SWITCH IN A SPACE-DIVISION MULTIPLEXING OPTICAL NETWORK

FIELD OF THE DISCLOSURE

The present disclosure generally relates to optical networks. More particularly, the present disclosure relates to systems and methods for controlling a programmable multi-rail switch in a Space-Division Multiplexing (SDM) optical network to align rails and optical components.

BACKGROUND

In a typical optical network, an optical fiber link from one network component to another involves a pair of fibers used for bidirectional communication. One optical fiber may be configured to transport optical signals from a first component to a second component in one direction (e.g., west to east, i.e., we use these terms to represent logical flow instead of actual geographic flow, e.g., west to east could also mean left to right in a logical sense), while the other optical fiber may be configured to transport optical signals from the second component to the first in the opposite direction (e.g., east to west). If the optical fiber link is down, management systems may be used to reroute optical signals via a different path. This single optical fiber link may be referred to as a primary link, whereby, in some cases, redundant backup paths may also be employed in a 1+1 protection scheme. The backup path can then be used when the primary link is down. However, these systems usually only have one path that is used at a time. As the capacity of optical fibers reaches its limit, some optical networks are moving toward the idea of using multi-rail configurations in which multiple communication channels between adjacent nodes (or network components) can be utilized for high-capacity transmission, where each "rail" may represent a single unidirectional optical fiber or two fibers for bidirectional communication. Space-Division Multiplexing (SDM) systems (e.g., multi-rail systems), however, have not been fully developed, optimized, or integrated in optical networks and may help to enable greater transmission capabilities over multiple channels.

BRIEF SUMMARY

The present disclosure is related to Space-Division Multiplexing (SDM) systems and methods, particularly for reconfiguring switches to assign rails and optical components based on various factors, such as relative quality metrics. Conventional SDM deployments are simply separate systems deployed in parallel. The present disclosure explores various embodiments for integration, including providing soft-fail characteristics to provide effective mitigation to the capacity reduction in the presence of failures. Due to the volume of equipment in multi-rail networks, the failure rate will be typically higher than today's systems and the criticality of failure is even more important for these ultra-high-capacity networks. Further, the present disclosure explores techniques to integrate equipment, such as optical amplifier equipment for multi-rail networks, e.g., having a module or device supporting multiple rails in an integrated manner can include redundancy for active components.

In an embodiment, a network element in a Space Division Multiplexed (SDM) optical network includes a first switch connected to a plurality of rails in a west direction relative to the network element; a second switch connected to the plurality of rails in an east direction relative to the network element; and a plurality of optical components, located between and connected to the first switch and the second switch, each optical component supporting a rail of the plurality of rails where each rail includes a fiber path being amplified in the SDM optical network, wherein each of the first switch and the second switch are configured to selectively switch individual rails of the plurality of rails to different optical components of the plurality of optical components.

The selectively switch can be based on a Quality of Service (QoS) rating such that a lower priority rail is preempted or placed on a lower quality optical component of the plurality of optical components, and wherein each of the plurality of rails is assigned the QoS rating and the selectively switch is based thereon. The QoS rating is determined based on any of fiber parameters, transmission equipment parameters, and environmental parameters. The selectively switch can be based on a failure at another network element in the SDM optical network such that a first rail that is already failed at the another network element is used by a second rail that has failed at the optical network element. The selectively switch can be based on a failure of another rail at another location in the SDM optical network such that a lower priority rail is preempted for a higher priority rail.

The first switch and the second switch each can support N ports, N being an integer equal to a number of rails of the plurality of rails. The first switch and the second switch each can support N ports, N being an integer greater than a number of rails of the plurality of rails. The network element can include one or more backup optical components connected to the first switch and the second switch and each used to protect any of the plurality of optical components upon failure thereof. The one or more backup optical components can be powered off until needed. The first switch and the second switch can be configured such that all inputs to the optical amplifier network element are on the first switch and all outputs are on the second switch. The first switch and the second switch can be configured to support loopbacks on individual rails of the plurality of rails.

The plurality of optical components can be in a single, integrated module supporting all of the plurality of rails. The first switch and the second switch can be in a separate module from the single, integrated module. The network element can further include a second single, integrated module supporting a second plurality of optical components, connected to the separate module, and used to protect the single, integrated module in case on a failure affecting the single, integrated module. Each component of the plurality of optical components can be an optical amplifier.

In another embodiment, a method implemented in a network element in a Space Division Multiplexed (SDM) optical network includes operating a plurality of rails in a west direction and an east direction, each relative to the network element, wherein the network element is configured to amplify each rail of the plurality of rails via a plurality of optical components; and selectively switching individual rails of the plurality of rails to different optical components of the plurality of optical components.

The selectively switching can be based on a Quality of Service (QoS) such that a lower priority rail is preempted or placed on a lower quality optical component of the plurality of optical components, and wherein each of the plurality of rails is assigned a QoS rating and the selectively switch is based thereon. The selectively switching can be based on a failure at another network element in the SDM optical network such that a first rail that is already failed at the another network element is used by a second rail that has failed at the optical network element. The selectively switching can be based on a failure of another rail at another location in the SDM optical network such that a lower priority rail is preempted for a higher priority rail.

In a further embodiment, an amplifier module for use in a network element in a Space Division Multiplexed (SDM) optical network includes a plurality of west ports connected to a plurality of rails in a west direction relative to the network element, the plurality of west ports each connected to a first switch; a plurality of east ports connected to the plurality of rails in an east direction relative to the network element, the plurality of east ports each connected to a second switch; and a plurality of amplifiers, located between the plurality of west ports and the plurality of east ports, each amplifier supporting a rail of the plurality of rails where each rail includes a fiber path being amplified in the SDM optical network, wherein each of the first switch and the second switch are configured to selectively switch individual rails of the plurality of rails to different amplifiers of the plurality of amplifiers.

BRIEF DESCRIPTION OF THE DRAWINGS

The present disclosure is illustrated and described herein with reference to the various drawings, in which like reference numbers are used to denote like system components/method steps, as appropriate, and in which:

FIG. 12 is a flow diagram illustrating an embodiment of a process for operating a network element in a Space Division Multiplexed (SDM) optical network.

DETAILED DESCRIPTION

Figure 1A:
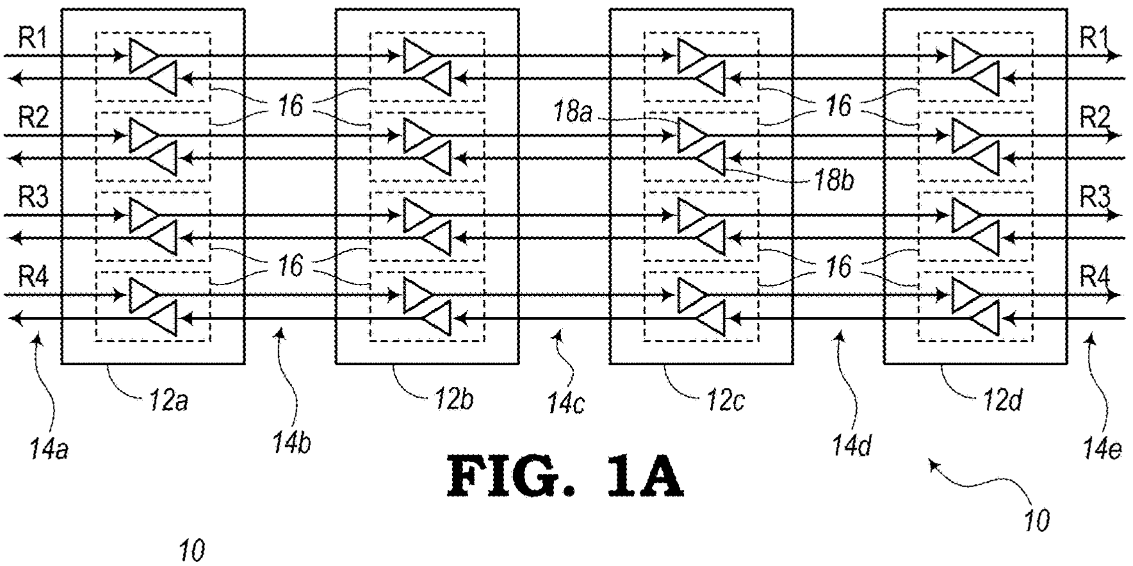
FIG. 1A is a schematic diagram illustrating an optical line system using multiple bi-directional rails, according to various embodiments.

In various embodiments, the present disclosure relates to systems and methods for increasing transmission capacity through an optical network. In the past, many efforts have been made to optimize bandwidth over a single optical fiber. However, there is just so far that these endeavors can be taken. Thus, some have begun to approach the concept of Space-Division Multiplexing (SDM) for opening up multiple communication channels along a link from one optical component to another. SDM, for example, may include the installment of multi-rail fibers that can be used in parallel. Another aspect of SDM may include the use of multi-mode fibers and multi-core fibers having negligible crosstalk between the fiber channels. It may be noted, however, that the installment of multi-rail fibers may be the most feasible way to increase signal transmission capacity.

As mentioned earlier, optical protection schemes such as 1+1 provide similar functionality, but do not provide full capacity when there are no network failures. That is, 1+1 protection requires a same amount of capacity for protection as for working traffic, and this is not feasible in multi-rail networks. To protect against serial failures in the path, “cascaded” or “ladder” protection schemes can be deployed. A protected ladder network may typically be delivered in a 1+1 configuration, which doubles the amount of equipment but delivers just the same amount of data transmission capacity. In other words, protection can be useful for backup purposes, but it can also be viewed by some as wasteful when the backup equipment is never used.

As suggested below, the typical protection solutions have their own set of problems, which are overcome by the embodiments described in the present disclosure. For instance, the conventional systems are unable to provide any type of reconfiguration of routes along a path between two network components in a multi-rail system. The systems and methods of the present disclosure enable switching at the interfaces between the SDM network components and SDM rails. This switching is configured to prioritize various routes along an optical line system when multiple rails are available, instead of merely relying on a simple physical routing scheme.

It may be noted that multi-rail configurations are starting to be deployed. Also, Multi-rail networks have not been sufficiently integrated with optical equipment. That is, conventional approaches are simply parallel, independent systems. The present disclosure also includes integrating multi-rail fibers with multi-rail components, e.g., an amplifier network element supporting multiple fibers (rails) in a single module or device. Also, conventional systems have not contemplated the concept of programmable rail assignment methodologies and programmable rail assignment switches. The programmable rail assignment systems and methods of the present disclosure are much more efficient and provide multiple times (e.g., 4X) the capacity when there are no faults in the system. Even when minor localized faults are present in such a system, the programmable rail assignment systems and methods described herein can still manage to provide perhaps a large percentage this capacity (e.g., 3X) to improve the delivered capacity in the presence of such failures.

Furthermore, the systems and methods of the present disclosure may include the measuring and testing of associated rails of fiber optic cables and multiple rails of optical equipment. Current solutions do not allow optimization of rails. More particularly, current solutions do not allow optimization of routes through rails based on quality parameters of the fibers and components. In some embodiments, for example, the rails may be prioritized based on highest to lowest quality (e.g., Quality of Service (QoS)). Thus, according to the implementations described herein, multiple rail routes can be configured based on quality parameters. Then, when updated quality parameters are obtained, the routes can be reconfigured as needed to maintain a highest to lowest priority strategy.

The embodiments of the present disclosure can separate the assignment of logical rails from physical rails. In other words, the prioritization of rails and routes through an optical line system are not necessarily dictated by a predetermined physical aspect of the rails (e.g., left to right, top to bottom, etc.) or by a previously monitored quality analysis performed before installation. Instead, the assignment of various routes can be determined based on the logically determined best route, second best route, third best route, and so on. Also, these routes can be reconfigured or reassigned dynamically over time as conditions change (e.g., when a fault is detected on a higher priority fiber or component and is then considered to be a lower priority fiber of component).

Thus, by separating the assignment of (or making a distinction between) logical rails from physical rails, the equipment can be dynamically configured to provide preferential QoS for specific logical rails. This allows the network operator to assign higher priority traffic to the highest QoS logical rail for maximum resilience. The relative QoS management can also be used to re-assign physical rails to logical rails in the presence of failures, thereby recovering the traffic and re-balancing to maintain QoS on the logical rails. By using an N×N switch instead of a 1×N (typically 1×2) switch it becomes possible to deliver capacity on all the paths in the network. Furthermore, the increase in the number of parallel paths allows advantageous switching as the 1 for N allows for a reduced loss of total network capacity. Note, while described herein as an N×N switch, it is also possible to use an N×M switch, N & M, as long as N is greater than or equal to the number of rails.

Fixed Rails of a Multi-Rail Optical Line System

FIG. 1A is a schematic diagram illustrating an embodiment of an optical line system 10 using multiple bi-directional rails R1, R2, R3, R4. In this embodiment, the optical line system 10 includes four rails. It should be noted that, according to other embodiments, the optical line system 10 may include any number of rails (e.g., two, eight, sixteen, etc.). Each rail R includes a pair of optical fibers, where one fiber is used for communication in one direction (e.g., west to east) and the other is used for communication in the other direction (e.g., east to west). Bidirectional rails are configured within a single "link" between optical components. Of course, we are describing an implementation where optical communication is performed unidirectionally on each fiber. Those skilled in the art will recognize there can be other implementations, which are also contemplated, such as, e.g., multi-core fibers, etc. That is, while described herein for one fiber per direction of a given rail, other implementations are contemplated. The various FIGS. described herein focus on the line system, namely the intermediate amplifiers. Those skilled in the art will appreciate there is corresponding terminal equipment which is omitted for illustration purposes.

As shown in this embodiment, the optical line system 10 includes a plurality of SDM components 12*a*, 12*b*, 12*c*, 12*d*, where each SDM component 12 is configured for multi-rail (or parallel) operation. Also, the optical line system 10 includes SDM links 14*a*, 14*b*, 14*c*, 14*d*, 14*e* for enabling communication between adjacent pairs of SDM components 12. In this embodiment, each SDM component 12 includes a pair of amplifiers (e.g., Erbium-Doped Fiber Amplifiers (EDFAs)) 16 on each rail. Thus, four amplifiers 18*a* of each SDM component 12 are arranged on the four rails for transmitting signals in a west-to-east direction and four amplifiers 18*b* of each SDM component 12 are arranged on the four rails for transmitting signals in an east-to-west direction. Again, the example here is four rails, eight fibers, and those skilled in the art will appreciate this is merely presented for illustration purposes.

Therefore, as capacities in networks continue to scale significantly, one of the methods used to significantly increase capacity is to use SDM to create additional "rails" R1, R2, R3, R4 as shown in FIG. 1A. Such rails can be either upon parallel fiber pairs, or in some applications these additional rails can be created in multi-core or multi-mode transmission fibers. Effectively, these are all SDM approaches that are contemplated and described herein.

When the paths or SDM links 14 are of sufficient distance, In-Line Amplifiers (ILAs) may be deployed to compensate for losses and maintain transmission quality. The amplifiers 18*a*, 18*b* may be ILAs. These ILAs can be discrete and independently arranged on each rail or they can be integrated into the SDM components 12 in which multiple rails are co-packaged and share components and control. That is, the present disclosure contemplates an optical amplifier module, device, and/or network element which supports multiple rails in an integrated manner, e.g., one module with eight amplifiers 18a, 18b.

It may be noted that the four rails R1, R2, R3, R4 or SDM links 14 along with the SDM components 12 (e.g., configured with four-rail operation) are capable of providing four times (4X) the usual amount of traffic. However, with four times the amount of equipment, there is also a greater risk that more faults may be experienced. As an interesting side note, in the past, equipment failures were located more often at terminals, due to the quantity and complexity of equipment. As terminal equipment (modems) have increase capacity, they have reduced components. With SDM, the line equipment scales linearly, and it is expected that equipment failures will become more an issue on the line as well.

Figure 1B:
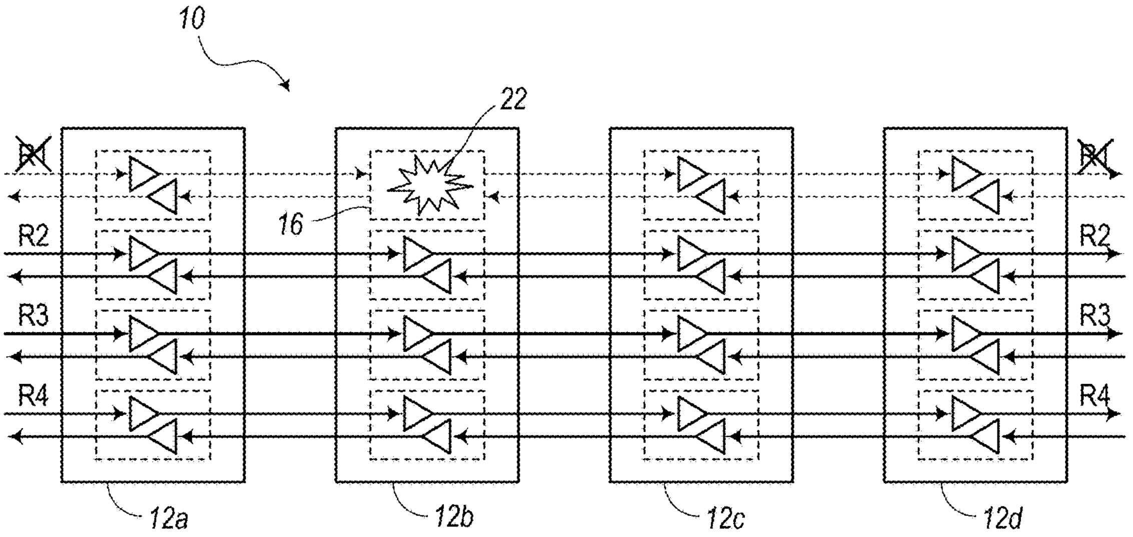
FIG. 1B is a schematic diagram illustrating the optical line system of FIG. 1A in which the presence of an equipment fault is detected on one of the rails, according to various embodiments.

FIG. 1B is a schematic diagram illustrating the optical line system 10 of FIG. 1A in which the presence of an equipment fault 22 is detected on one of the rails (i.e., R1). In particular, the equipment fault 22 may be detected on the first pair of amplifiers 16 on SDM component 12b. With this equipment fault 22, rail R1 is down and may be unable to propagate signals. However, because of the redundancy of multiple rails, the optical line system 10 is still capable of providing 3× the usual amount of traffic therethrough. That is, the equipment fault 22 only takes down one rail out of four.

Figure 1C:
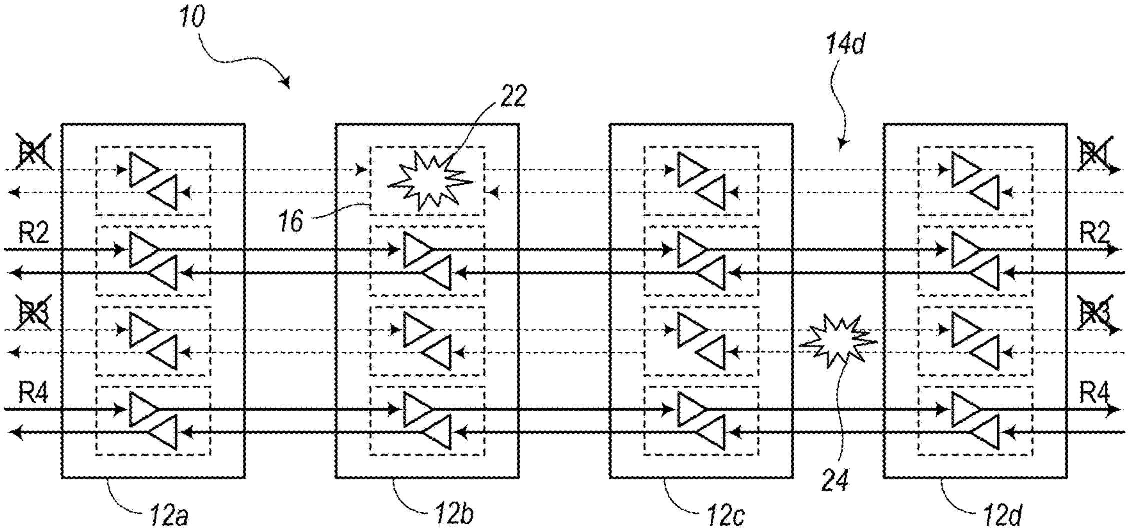
FIG. 1C is a schematic diagram illustrating the optical line system of FIG. 1B in which the presence of a fiber fault, in addition to the equipment fault, is also detected on one of the rails, according to various embodiments.

FIG. 1C is a schematic diagram illustrating the optical line system 10 of FIG. 1B in which the presence of a fiber fault 24 (in addition to the equipment fault 22) is also detected on one of the rails (i.e., R3). Therefore, with these two faults 22, 24 on two different rails, the capacity is dropped to 2X the usual amount, which is still an improvement. However, by reconfiguring the routes, as described below, the faults 22, 24 can be aligned in some cases in order to allow the optical line system 10 to operate at 3× capacity until all the faults are resolved.

Thus, the cascade of multi-rail ILAs and transmission fibers create a high-capacity path through the network or optical line system 10. The optical line system 10 can therefore be designated as a “soft-fail” system that is able to maintain as much capacity as possible. For example, as described below, if one rail has a failure (fiber or equipment) in a four-rail system, then it is possible to maintain 75% of the full path capacity using the remaining equipment. In FIG. 1C, with two rails having separate failures, only 50% of the full path capacity is provided, but it is possible to reroute one of these failures to provide enhanced resiliency.

Optical Line System with Programmable Routes

Figure 2A:
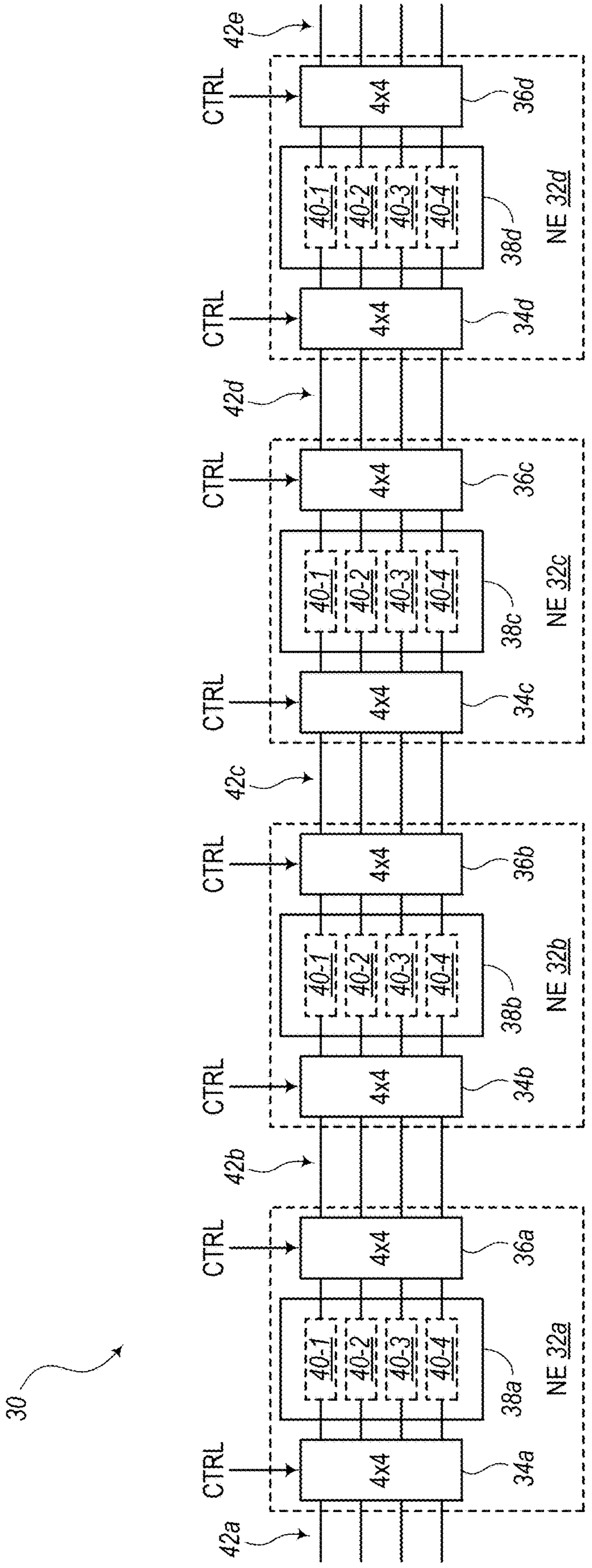
FIG. 2A is a schematic diagram illustrating another optical line system using multiple rails, according to various embodiments of the present disclosure.

FIG. 2A is a schematic diagram illustrating another optical line system 30 using multiple rails (e.g., four rails, again which is just presented for illustration purposes). As shown in this embodiment, the links 42a, 42b, 42c, 42d, 42e may each represent four bidirectional pairs of fibers similar to the embodiment of optical line system 10 of FIG. 1A. In contrast to the simple pass-through of ILAs shown in FIG. 1A, the optical line system 30 is configured such that each Network Element (NE) 32a, 32b, 32c, 32d (or node) includes a first switch 34a, 34b, 34c, 34d at one interface and a second switch 36a, 36b, 36c, 36d at another interface. With a four-rail system, for example, the switches 34, 36 may be 4×4 optical switches for optically connecting any fiber rails to any components with the NEs 32.

Furthermore, the NEs 32a, 32b, 32c, 32d include modules 38a, 38b, 38c, 38d, respectively, wherein the modules 38 may each include four optical components 40-1, 40-2, 40-3, 40-4 on the four rails. The optical components 40-1, 40-2, 40-3, 40-4 may be optical amplifiers, EDFAs, Raman amplifiers, switches, routers, multiplexers, demultiplexers, and/or other optical equipment. In some embodiments, the optical components 40-1, 40-2, 40-3, 40-4 may be packaged together within the modules 38.

In an initial setup, the first set of switches 34 may be configured to align a highest priority rail (e.g., top rail) with a highest priority optical component 40 (e.g., optical component 40-1). For the sake of simplicity, supposed the top rail of each link 42 is the highest priority rail, the second rail from the top of each link 42 is the second highest priority rail, the third rail from the top of each link 42 is the third highest priority rail, and the lowest rail of each link 42 is the lowest priority rail. It may be noted that the arrangement of the separate rails and the arrangement of the optical components 40, as shown in FIG. 2A, may be arbitrary. Also, in some embodiments, the priority of the rail may be based on quality, whereby the rail determined to have the best quality (e.g., highest QoS, highest SNR, lowest noise, etc.) is given the highest priority.

Figure 2B:
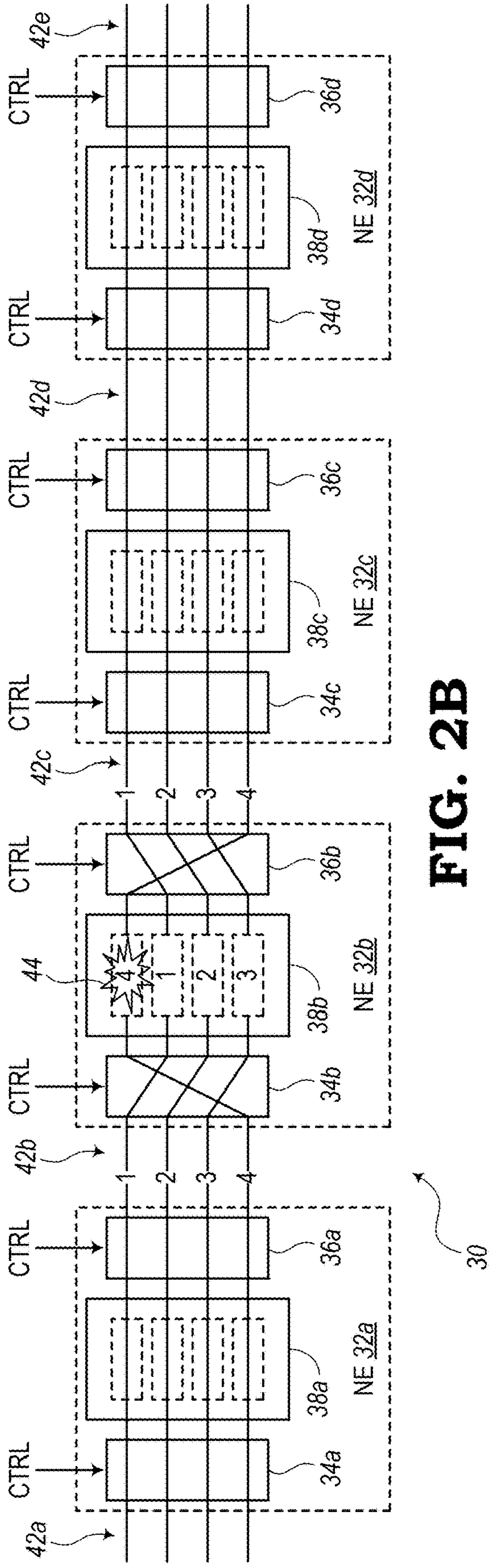
FIG. 2B is a schematic diagram illustrating the optical line system of FIG. 2A in which the presence of an equipment fault is detected on one of the rails and corresponding switches are reconfigured accordingly to reprioritize the routes through the optical line system, according to various embodiments.

FIG. 2B is a schematic diagram illustrating the optical line system 30 of FIG. 2A in which the presence of an equipment fault 44 is detected on one of the rails. The switches 34, 36 may be initially configured to align the highest priority rails 42 with the highest priority components 40 of each module 38, thereby creating four routes through the optical line system 30 prioritized by some quality parameter. However, when the equipment fault 44 is detected in NE 32b, the adjacent switches 34b, 36b can be reconfigured in response to a “re-prioritization” of the rails. That is, because of the equipment fault 44, this component 40-1 is then currently no longer the highest priority component. For example, the rails of link 42b may be prioritized using numerals 1-4 from highest to lowest priority. Also, the components 40-1, 40-2, 40-3, 40-4 may initially be prioritized using numerals 1-4 from highest to lowest priority. However, the equipment fault 44 on the highest priority component 40-1 may then lower this component to the bottom of the priority list (i.e., priority numeral 4), which may thereby change the priority of the remaining optical components 40-2, 40-3, 40-4 of the module 38b of the NE 32b. That is, the new priority order may be 4, 1, 2, 3 from top to bottom.

Therefore, based on the new priority list, due to the change in quality parameters resulting from the equipment fault 44, the switches 34b and 36b may be reconfigured to align the fault component with the lowest priority rail (e.g., numeral 4) of the links 42b and 42c. The corresponding switches 34b, 36b are reconfigured accordingly to reprioritize the routes through the optical line system 30.

Random failures (e.g., equipment fault 44) can impact all the rails of the optical line system 30 evenly. As such, traffic can be impacted equally on any rail, resulting in a decrease of network throughput. Therefore, it is advantageous to introduce the concept of rail quality (e.g., rail QoS) and optical component quality such that not all rails have the same likelihood of failure. Whilst it is still true that all of the rails may be impacted, the network can be configured to bias the QoS for each of the rails, and recovery methods can consolidate any failed elements on the lowest QoS rail (network coordination). This can enhance the “soft-fail” nature of the network Therefore, superseding the concept of physical rails which may initially have set prioritization levels, the systems and methods of the present disclosure is configured to use a logical strategy for logically aligning rails to maintain the highest quality for the highest priority routes and so on. The “logical rail” can describe the network path in terms of its characteristics (e.g., QoS, Quality of Experience (QoE), SNR, Optical SNR (OSNR), low latency, low noise, low jitter, performance margin, margin ageing trend, etc.), whereas the "physical rail" may describe the actual equipment, or fiber, which is used to transport data.

For example, in a four-rail system, logical rail #1 can be assigned the highest rail QoS and logical rail #4 can be assigned the lowest rail QoS. This allows the operator to assign traffic to each of the logical rails based upon the QoS requirement. In one embodiment, this N-rail QoS can be assigned between all N available physical rails. In another embodiment, this N-rail QoS can be assigned to N+1 physical rails in a 1:N protected system. In a further embodiment, this N-rail QoS can be assigned to N+M physical rails in a M:N protected system.

The optical line system 10 of FIG. 1A presents a rail path assignable solution for multi-rail transmission that can improve the network availability and resilience of "soft-fail" networks. This can be applied in both discrete and integrated multi-rail ILAs, but presents an advantageous solution when deployed with integrated ILAs. The present embodiments include the concept of rail QoS to bias the optimization to deliver more reliable transport on some rails over others in the same multi-rail group.

Figure 2C:
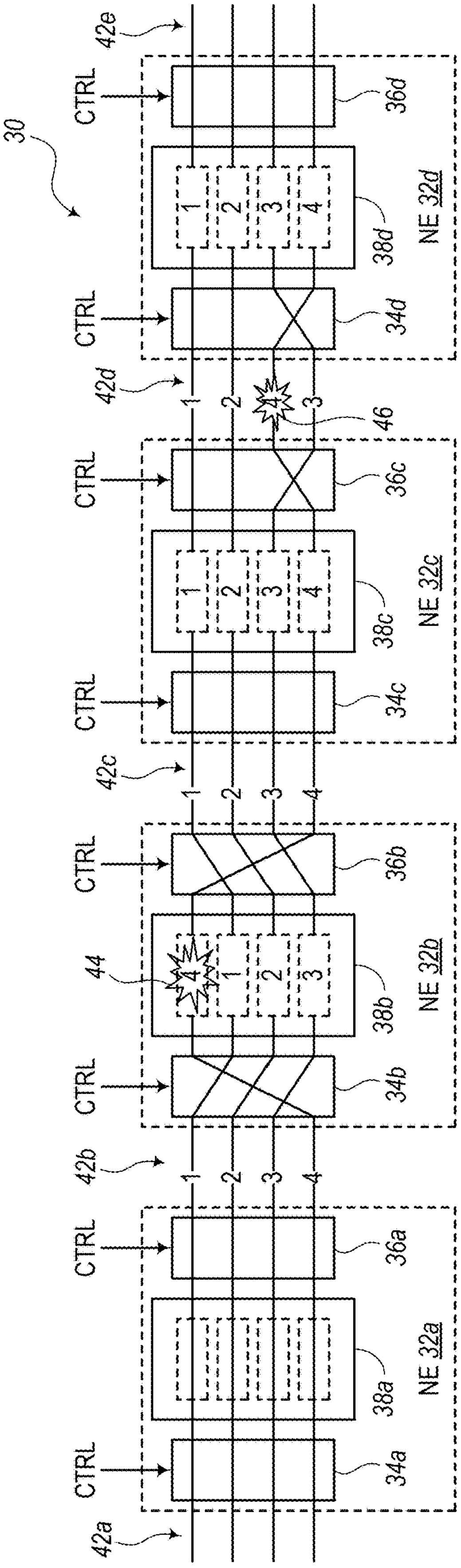
FIG. 2C is a schematic diagram illustrating the optical line system of FIG. 2B in which the presence of a fiber fault is also detected on one of the rails and the corresponding switches are reconfigured accordingly to reprioritize the routes through the optical line system, according to various embodiments.

FIG. 2C is a schematic diagram illustrating the optical line system 30 of FIGS. 2A and 2B in which the presence of a fiber fault 46 is also detected on one of the rails (e.g., third priority rail) in the link 42*d*. The corresponding switches in this case involve one switch 36*c* from the NE 32*c* and one switch 34*d* from the NE 32*d*. Specifically, these switches 36*c*, 34*d* are arranged at the interfaces of the NEs 32*c*, 32*d* adjacent to the link 42*d* in which the fiber fault 46 is detected. As shown, the switches 36*c*, 34*d* are reconfigured accordingly to reprioritize the routes through the optical line system 30. In particular, the rail with the fiber fault 46 is dropped down to the lowest priority (e.g., numeral 4) and the switches 36*c*, 34*d* realign the paths such that the fiber fault 46 is placed in the lowest priority route. It may be noted that the two faults (i.e., equipment fault 44 and fiber fault 46 are aligned with the lowest priority route, thereby preserving the remaining routes, and allowing the optical line system 30 to operate at 3× the normal capacity, even with two faults on different physical rails. In a sense, the lowest priority route, with one or more faults, may be considered to be a sacrificial route and might be bypassed with respect to attempting to carry traffic therethrough. At a later time, when the faults 44, 46 can be fixed, a reevaluation of the quality of the rails and equipment can be made, prioritization can be recalculated, and the switches 34, 36 throughout the optical line system 30 can be reconfigured to dynamically realign or reassign the various routes based on the new quality metrics.

When multiple serial failures occur in the line, the switches can be re-configured to ensure that all of the failed elements (equipment or fiber paths) are aligned on the same logical rail #4. In this way, the second failure at a different location does not reduce the deliverable capacity. This is configured to improve the availability of the network to multiple failures in the path and preferentially preserves the higher QoS logical rails. Thus, if there are relatively few faults spread throughout the optical line system 30 it may be possible to maintain the 3× capacity until the faults can be resolved and the system can return to 4×.

Therefore, with the programmable rail assignment switches (e.g., switches 34, 36) arranged at the interfaces of the NEs 32 and the links, the impact of multiple failures can be reduced. Also, examples of pre-emptive failure detection can be used to adjust the QoS ratings for different elements and can preferentially bias the QoS of the logical rails. These can be re-assigned during a maintenance window to re-optimize the resilience of the network before a failure occurs.

Network Elements with Programmable Multi-Rail Route Switching Capabilities

Figure 3:
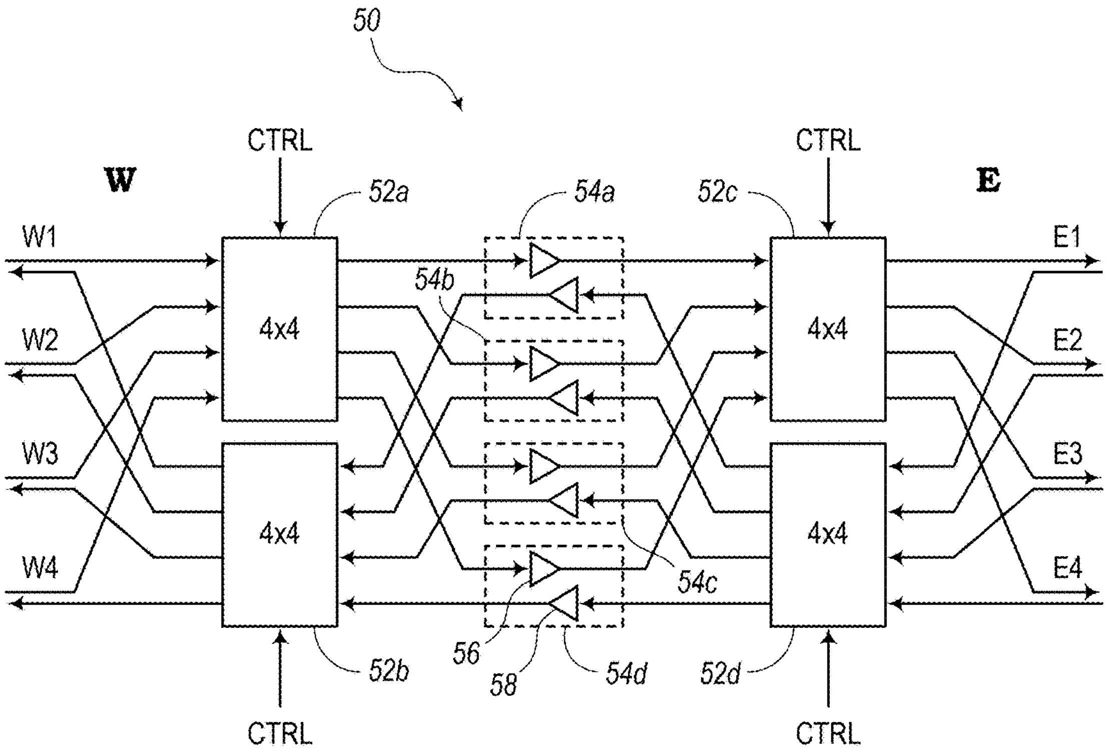
FIG. 3 is a schematic diagram illustrating a Network Element (NE) in an optical line system using multiple rails, the NE having 4×4 optical switches for enabling the reconfiguration of routes through optical components, according to various embodiments.

FIG. 3 is a schematic diagram illustrating an embodiment of a Network Element (NE) 50, which may be installed in an optical line system that uses multiple rails. The NE 50 may include four switches 52*a*, 52*b*, 52*c*, 52*d* (e.g., optical switches, optical cross-connect switches, etc.). Switch 52*a* may be an ingress switch configured at a west interface (or west degree) and may be configured to receive inputs from four west rails W1, W2, W3, W4 and provide outputs to each of four parallel optical components 54*a*, 54*b*, 54*c*, 54*d*. Switch 52*b* may be an egress switch configured at the west interface and may be configured to receive inputs from the four parallel optical components 54*a*, 54*b*, 54*c*, 54*d* and provide outputs to the four west rails W1, W2, W3, W4. Switch 52*c* may be an egress switch configured at an east interface (or degree) and may be configured to receive inputs from the four parallel optical components 54*a*, 54*b*, 54*c*, 54*d* and provide outputs to four east rails E1, E2, E3, E4. Switch 52*d* may be an ingress switch configured at the east interface and may be configured to receive inputs from the four east rails E1, E2, E3, E4 and provide outputs to the four parallel optical components 54*a*, 54*b*, 54*c*, 54*d*.

Each of the four parallel components 54*a*, 54*b*, 54*c*, 54*d* may include a west-to-east element 56 (e.g., amplifier) and an east-to-west element 58 (e.g., amplifier). Each of the components 54 may be configured as a module for bidirectional communication. In some embodiments, the multiple parallel components 54*a*, 54*b*, 54*c*, 54*d* may be integrated into a four-rail module.

Thus, the NE 50 enables the reconfiguration of various routes through the parallel components 54 to prioritize the routes based on some parameters, such as a quality parameter. Again, the switches 52*a*, 52*b*, 52*c*, 52*d* enable any west rail W1, W2, W3, W4 to be assigned with any component 54 and any component 54 to be assigned with any east rail E1, E2, E3, E4. It may also be noted that the routes in one direction (e.g., west-to-east routes) do not necessarily need to be the same as the routes in the other direction (e.g., east-to-west routes). Therefore, if there is a fault of one of the elements 56, 58, but not the other, and/or if the relative quality of one of the elements 56, 58 is different than the other, then the switches 52 may include a reassignment where the routes in one direction are different than the routes in the other direction.

A fault (and quality parameter detection) may be on individual optical component levels or for the pair. Therefore, it can be individual or can be a bidirectional component. In other words, the routes in the two directions may be different. That is, as shown in FIG. 3, the entire component 54*a*, 54*b*, 54*c*, 54*d* may be defective and can be bypassed OR one of the components 56 in one direction (W to E) may be defective while the other one is fine (E to W). Therefore, switches 52*a*, 52*c* do not necessarily need to be configured/assigned the same way as switches 52*b*, 52*d*.

The embodiments of the present disclosure describe a distinction between the "logical rail" from the "physical rail" in multi-rail optical networks through the use of programmable multi-rail assignment switches (e.g., switches 52*a*, 52*b*, 52*c*, 52*d*) to provide improved soft-failure performance (failure resilience) in multi-rail networks. Again, a "rail" may be a pair of optical fiber links used for bidirectional propagation of optical signals (or a single fiber for propagation in one direction). By providing an N×N optical switch at the line interface of N-rail optical equipment, the NE 50 is able to logically and strategically program the assignment of the photonic equipment for a single rail to a given optical path. Physically, this can be imagined for a four-rail ILA site as shown in FIG. 3.

The programmable switches 52*a*, 52*b*, 52*c*, 52*d* are configured to receive control signals from an exterior control device. The control signals are configured to cause the switches 52 to optically connect any of the input ports to any of the output ports. This allows the separation of the "logical path" through the network from the "physical path" through the equipment.

The control device may be configured to receive telemetry information from the NE 50. For example, the telemetry information may include measurements or other monitoring values of various parts of the fibers and elements 56, 58. Based on determining the relative quality factors (e.g., which fibers or element 56, 58 include the highest relative quality, second highest, and so on), the control device can logically set the switches accordingly to assign the rails and elements based on quality (e.g., QoS).

The NE 50 is configured to switch or reconfigure accordingly to present routes with a lowest risk of failure, second lowest, third lowest, and so on. Using the programmable rail switches 52 and the quality ratings, it is also possible to reconfigure the equipment such that failures in multiple locations in the network align to be on the same "logical path" even though the actual failures on the "physical path" may be on different rails. This allows consolidation of the failed equipment and/or links to minimize the overall impact on the network capacity.

The inclusion of these ingress and egress switching elements allows each of the components 54 (e.g., amplifiers) to be independently assignable to the (external) transmission fibers. An example of amplifier switching may include traffic from the West on rail W1 (e.g., highest priority ranking) going to East on rail E1 (e.g., highest priority ranking) using the amplifiers of component 54*d* (e.g., normally having the lowest priority ranking). For example, perhaps in this case, the component 54*d* may have been replaced with another component that is reevaluated as having the highest relative quality compared with components 54*a*, 54*b*, and 54*c*. Also, in another example, the switches 52 on one side (e.g., switches 52*c*, 52*d* on East degree) may be reassigned based on changes in quality parameters on the rails E1, E2, E3, E4. This enables the switches 52*c*, 52*d* to perform fiber path switching, which may include dynamic re-routing around a fiber plant (and/or any equipment issues). For example, fiber path switching may include switching traffic from the West on rail W1 and transition to the East on rail E3 via amplifier of component 54*a*.

Figure 4:
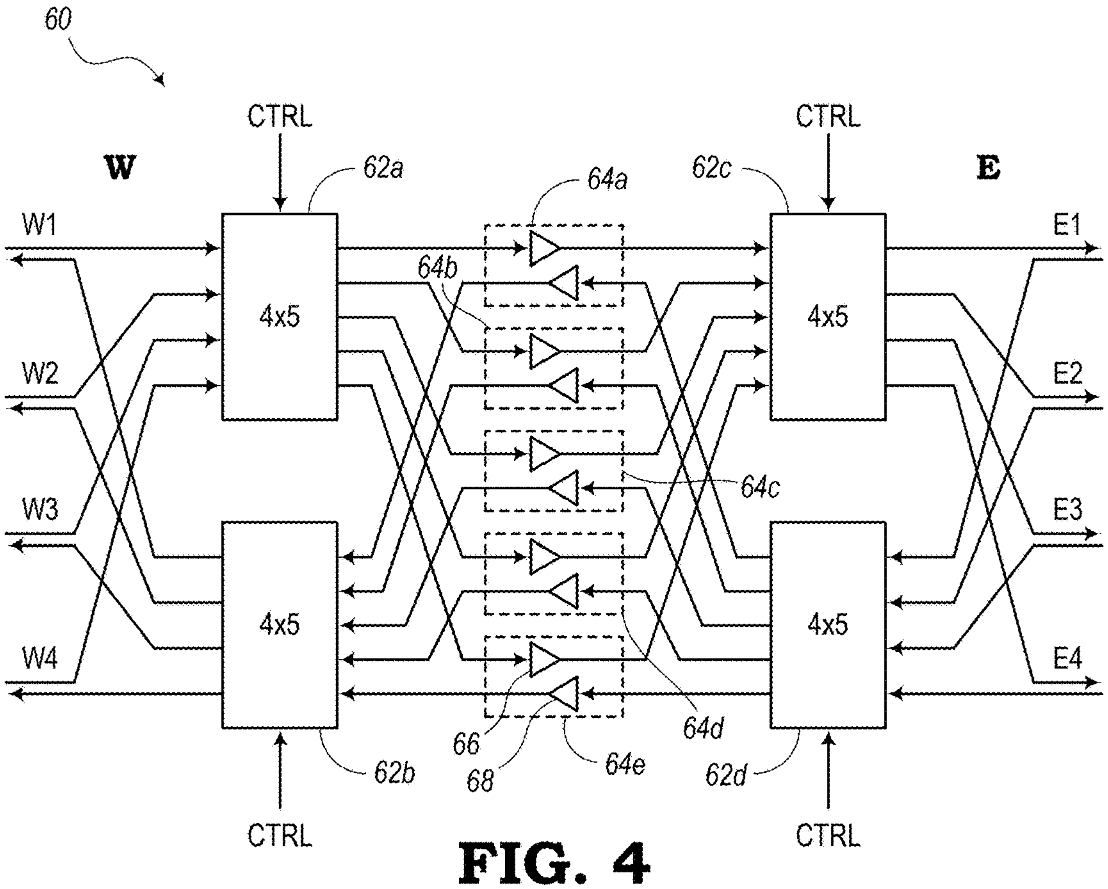
FIG. 4 is a schematic diagram illustrating an NE in an optical line system using multiple rails, the NE having 4×5 optical switches for enabling the reconfiguration of routes through the optical components, according to various embodiments.

FIG. 4 is a schematic diagram illustrating another embodiment of an NE 60 in an optical line system using multiple rails. In this embodiment, the NE 60 may include 4×5 optical switches 62*a*, 62*b*, 62*c*, 62*d*. This enables routes through the five different optical components 64*a*, 64*b*, 64*c*, 64*d*, 64*d* using any suitable arrangement. In this case, if it is determined that an optical component 64 is more likely to fail than the adjacent west and east rails, then an extra optical component 64 may be introduced to allow the NE 60 to continue transmitting along all four rails, even in the event that one of the components 64 fails. Each optical components 64 may also include bidirectional amplifiers, such as a west-to-east amp 66 and an east-to-west amp 68.

In some cases, this arrangement may be similar to protected optical networks where, for example, 1+1 protection can also provide resilience to multiple failures. However, in those conventional networks, the protection is constructed as simply one single working path and one single standby path for protection, such that the initial capacity of the network is not doubled, which may be deemed in some cases to be unnecessarily wasteful. In the multi-rail environment of the present disclosure, initially all of the equipment is operational resulting in NX (e.g., 4×) capacity for a multi-rail network. The e QoS rail assignment allows full 4× capacity when all the equipment is operating normally and does not require dedicated standby equipment. Also, it can be used to maximize the network capacity even in the event of multiple failures. Furthermore, the assignment of physical rail equipment based upon relative QoS allows the QoS of the logical rails to be biased to minimize traffic hits for the highest priority traffic. As N increases, the fractional capacity impact is reduced ((N−1)/N), further increasing the value of muti-rail networks.

The N×M switching layer of FIG. 4 may be an example of an N-rail system with ILA equipment with a 1:N redundancy or backup. The spare ILA can be kept in a powered off state to conserve power and can be switched in to replace a degraded or failed ILA. This simply extends the capability to add additional facilities that can be assigned to one of the logical rails. The example shows a single redundant facility, but more can be added if desired to present an (M−N):N redundancy. According to other embodiments, the N×M arrangement may be configured whereby M>N, as shown. In other embodiments N>M if it is noted that rails are more likely to fail than the components. This may be the case, for example, if the optical equipment module housing has good physical protection from the environment and is less likely to experience a defect. Other N×M arrangements may include 4×6, 6×4, 8×9, 9×8, 8×10, 10×8, etc. Therefore, instead of primary and backup paths for transmission along one route at a time, there will be multiple routes available at all times for high-capacity transmission.

Figure 5:
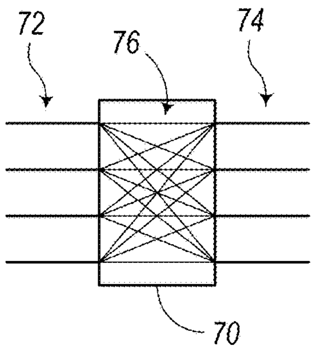
FIG. 5 is a diagram illustrating the switching options for the 4×4 optical switches shown in FIG. 3, according to various embodiments.

FIG. 5 is a diagram illustrating an example of the switching options for a 4×4 optical switch 70, such as the switches 52*a*, 52*b*, 52*c*, 52*d* shown in FIG. 3. The 4×4 optical switch 70 includes a first set of ports configured for optical communication with rails 72 and a second set of ports configured for optical communication with paths 74 to internal optical components (e.g., optical components 54). The optical paths through the 4×4 optical switch 70 may include arrangement options or optical switching pathways 76, where any rail 72 can be optically aligned or matched with any path 74 leading to the internal optical components based on quality factors of the rails 72 and internal optical components.

Figure 6:
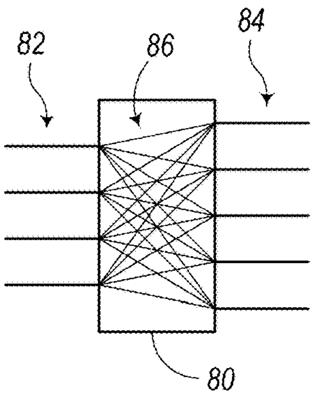
FIG. 6 is a diagram illustrating the switching options for the 4×5 optical switches shown in FIG. 4, according to various embodiments.

FIG. 6 is a diagram illustrating an example of the switching options for a 4×5 optical switch 80, such as the switches 62*a*, 62*b*, 62*c*, 62*d* shown in FIG. 4. The 4×5 optical switch 80 includes a first set of ports configured for optical communication with four rails 82 and a second set of ports configured for optical communication with five paths 84 to internal optical components. The optical paths through the 4×5 optical switch 80 may include arrangement options or optical switching pathways 86, where any of the four rails 82 can be optically aligned or matched with any path 84 leading to the five internal optical components based on quality factors of the rails 82 and internal optical components.

Multi-Rail Switching with Loopback Capabilities

Figure 7:
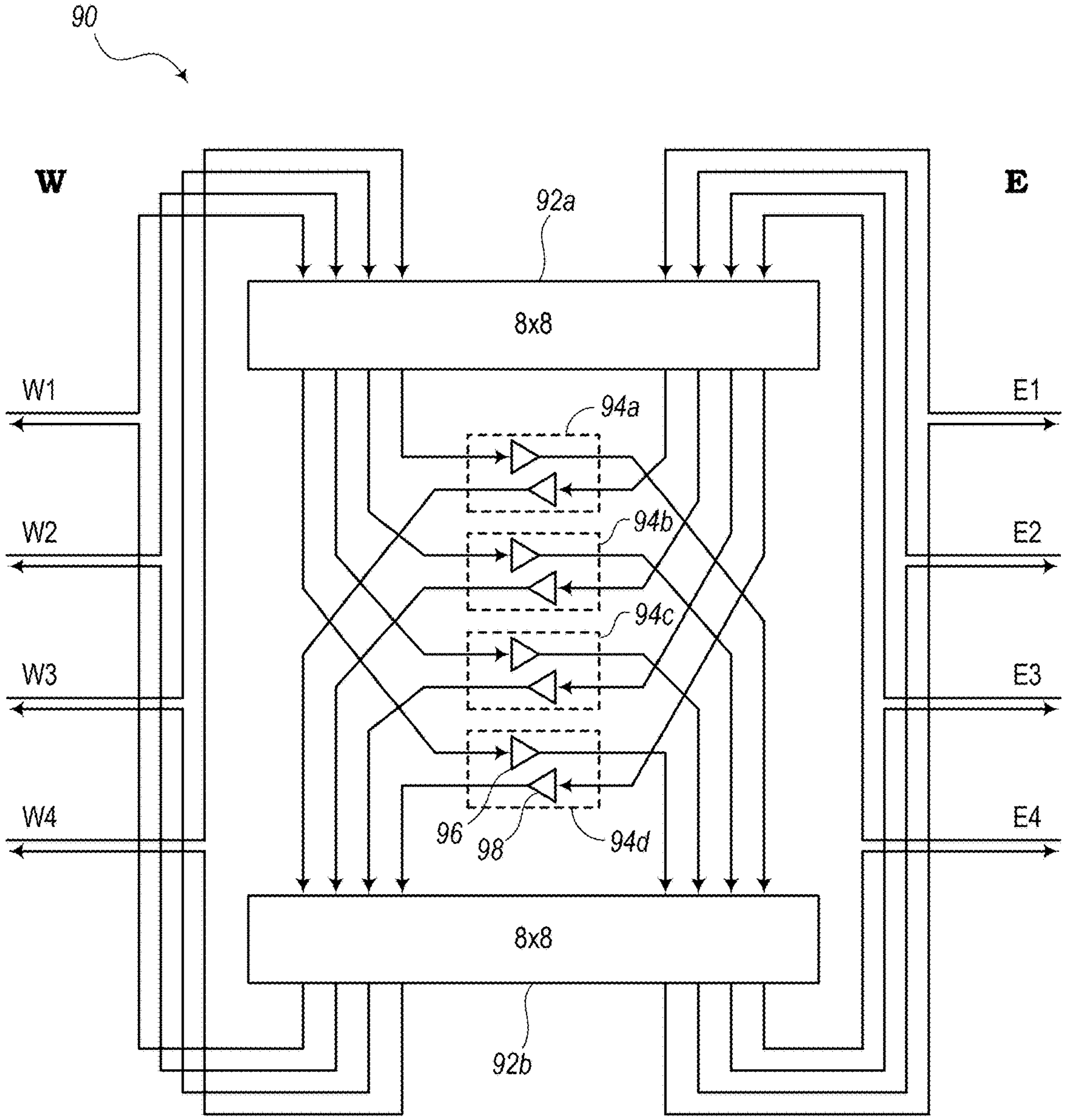
FIG. 7 is a schematic diagram illustrating an NE in an optical line system using multiple rails, the NE using 8×8 optical switches for enabling the reconfiguration of routes through optical components and for further enabling loop-back transmissions, according to various embodiments.

FIG. 7 is a schematic diagram illustrating an embodiment of an NE 90 in an optical line system using multiple rails W1, W2, W3, W4 (on the West interface) and E1, E2, E3, E4 (on the East interface). The NE 90 includes 8×8 optical switches 92*a*, 92*b*. The first 8×8 optical switch 92*a* is configured to receive inputs from both the west and east rails and provide outputs to bidirectional pairs of optical components 94*a*, 94*b*, 94*c*, 94*d* (in both directions). The second 8×8 optical switch 92*b* is configured to receive inputs from the bidirectional pairs of optical components 94*a*, 94*b*, 94*c*, 94*d* (in both directions) and provide outputs to the west and east rails. Each of the optical components 94 includes a first element 96 for communication in one direction and a second element 98 for communication in the other direction.

Similar to other NEs, the NE 90 of FIG. 7 is also configured to enable the reconfiguration or rearrangement of the routes through the optical components 94 as desired. However, in addition to the rearrangement of rails and components, the arrangement of the 8×8 optical switches 92*a*, 92*b* of the NE 90 further enables loopback transmission. In other words, incoming signals from any west rail may be looped back onto any outgoing west rail, while including the optical component 94 (e.g., amplifier). Thus, the NE 90 adds functionality that can be used for applications such as fault isolation, system tuning, and/or calibration. In some respects, the 8×8 optical switch 92*a* may be considered to be a combination of the two 4×4 optical switches 52*a*, 52*d* shown in FIG. 3 for receiving inputs from the rails, while the 8×8 optical switch 92*b* may be considered to be a combination of the two 4×4 optical switches 52*b*, 52*c* shown in FIG. 3 for receiving inputs from the internal optical components.

Embodiments of Programmable SDM Assignment Switches

Therefore, the present disclosure may simply be directed to a programmable Space-Division Multiplexing (SDM) assignment switch that may be arranged at an interface between a multi-rail path of an SDM optical line system and an SDM Network Element (NE). In some implementations, the programmable SDM assignment switch may include a first set of ports configured for connection with a plurality of rails of the multi-rail path and a second set of ports configured for connection with a plurality of photonic components of the SDM NE. Each rail of the multi-rail path may include a pair of optical fibers used for bidirectional propagation of optical signals through the SDM optical line system. The programmable SDM assignment switch may further include a plurality of optical switching pathways to enable each port of the first set of ports to be logically assigned with a corresponding port of the second set of ports for enabling optical communication over multiple paths.

In some embodiments, based on a first set of relative quality rankings of rails of the multi-rail path and a second set of relative quality rankings of photonic components of the SDM NE, the programmable SDM assignment switch may be configured to a) assign the rail having the highest relative quality ranking of the first set of relative quality rankings with the photonic component having the highest relative quality ranking of the second set of relative quality rankings, and b) assign the rail having the lowest relative quality ranking of the first set of relative quality rankings with the photonic component having the lowest relative quality ranking of the second set of relative quality rankings, along with intermediate assigning to intermediate rankings. The first and second sets of relative quality rankings, for example, may be defined by a) a Quality of Service (QoS) metric, b) a Quality of Experience (QoE) metric, c) insertion loss, d) Optical Return Loss (ORL), e) results of an Optical Time-Domain Reflectometry (OTDR) test, f) a risk of failure metric, g) Signal-to-Noise Ratio (SNR), h) latency, i) noise, j) jitter, k) a phase offset metric, l) pump margin, m) an efficiency metric, and/or n) a trend analysis.

According to further embodiments, the SDM NE may include a plurality of photonic components having a) optical amplifiers, b) In-Line Amplifiers (ILAs), c) Erbium-Doped Fiber Amplifiers (EDFAs), d) switches, e) routers, f) multiplexers, g) demultiplexers, h) transceivers, and/or i) Reconfigurable Optical Add-Drop Multiplexers (ROADMs). The plurality of photonic components of the SDM NE may be configured in a single integrated module in some embodiments.

In some embodiments, the programmable SDM assignment switch may be an N×N optical switch, wherein N is an integer, and wherein the N×N optical switch is configured to enable high-capacity transmission of up to N optical signal streams between N rails of the multi-rail path and N photonic components of the SDM NE. The N×N optical switch, for example, may be a 4×4 optical switch. In some embodiments, the programmable SDM assignment switch may be an N×M optical switch, wherein N and M are integers and where M is greater than N, thereby establishing M−N redundant standby paths for protection. The N×M optical switch may be configured to enable simultaneous transmission of up to N optical signals between N rails of the multi-rail path and N selected photonic components of a plurality of M photonic components of the SDM NE.

According to some implementations, the programmable SDM assignment switch may be configured to logically assign each rail of the multi-rail path with a corresponding photonic component of the SDM NE in a manner that is independent of a physical arrangement of the rails and photonic components. The programmable SDM assignment switch of claim 1 may also be configured to shut down a lowest priority route through the multi-rail path and SDM NE when one or more of temperature and power exceeds acceptable thresholds. The multi-rail path may include a fiber optic cable or fiber span, and wherein the fiber optic cable or fiber span can be configured to support between 4800 and 9600 GHz of spectrum capacity in the C band and/or C+L band, although other ranges are also contemplated. The rails of the SDM optical line system, for example, may be defined by a) parallel optical fibers, b) multi-core transmission fibers, or c) multi-mode transmission fibers.

In some embodiments, the SDM NE described above may include the programmable SDM assignment switch and may further include a second programmable SDM assignment switch arranged at a second interface between a second multi-rail path of the SDM optical line system and photonic components of the SDM NE. The configuring and reconfiguring of the programmable SDM assignment switch and second programmable SDM assignment switch may be controlled by an external control device configured to receive telemetry information regarding a quality metric of each rail of the multi-rail path, each rail of the second multi-rail path, and each photonic component of the SDM NE. A fault in the SDM optical line system beyond the multi-rail path and second multi-rail path may cause the programmable SDM assignment switch and second programmable SDM assignment switch to preemptively assign a lower priority rail of the multi-rail path and second multi-rail path and a lower priority rail of the photonic components of the SDM NE to a corresponding rail associated with the fault.

For bidirectional operation, the programmable SDM assignment switch may include a first N×N optical switch configured to receive input optical transmissions from the multi-rail path and a second N×N optical switch configured to provide output optical transmissions to the multi-rail path.

The second programmable SDM assignment switch may include a third N×N optical switch configured to provide output optical transmissions to the second multi-rail path and a fourth N×N optical switch configured to receive input optical transmissions from the second multi-rail path. Each of the first and second multi-rail paths may include N rails, wherein the programmable SDM assignment switch is further arranged at the second interface. The second programmable SDM assignment switch is further arranged at the first interface. The programmable SDM assignment switch may include a first 2N×2N optical switch (e.g., 8×8 optical switch) configured to receive input optical transmissions from the multi-rail path and second multi-rail path. The second programmable SDM assignment switch may include a second 2N×2N optical switch configured to provide output optical transmissions to the first and second multi-rail paths. The first and second 2N×2N optical switches may be configured to support loopback to the first or second multi-rail paths.

Reassigning Routes Through Multi-Rail System Based on Fault Detection

Figure 8:
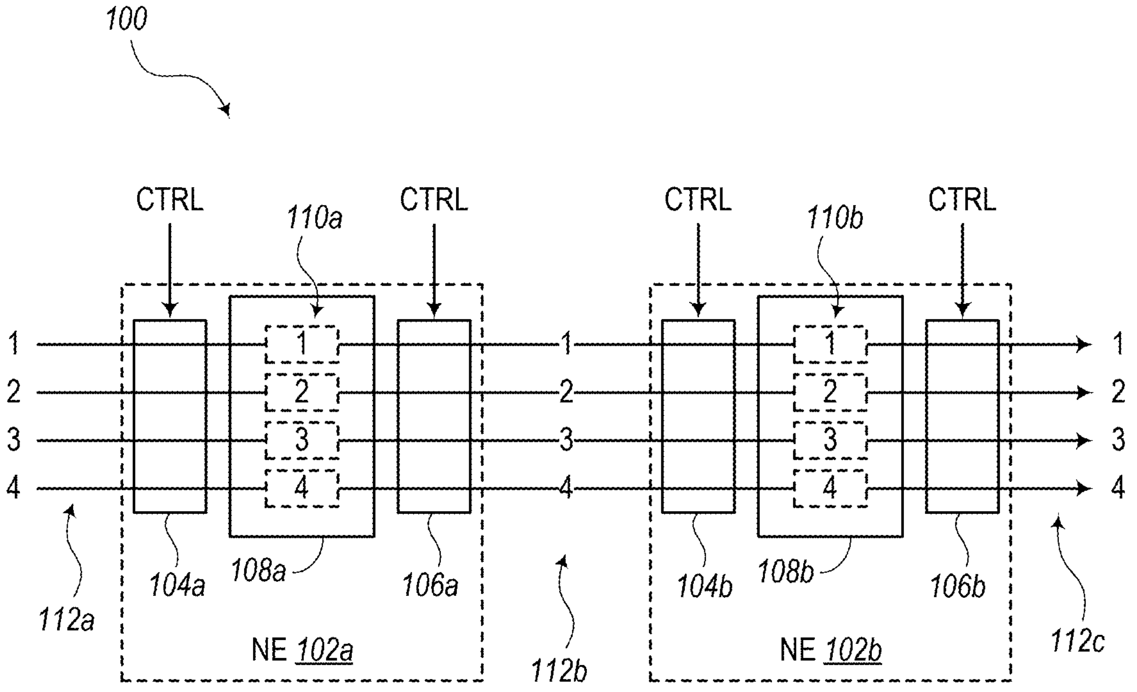
FIG. 8 is a schematic diagram illustrating a portion of an optical line system with two NEs in which the routes are arranged logically, according to various embodiments.

FIG. 8 is a schematic diagram illustrating a portion of an optical line system 100 having two NEs 102*a*, 102*b*. The NEs 102*a*, 102*b* includes first switches 104*a*, 104*b* and second switches 106*a*, 106*b*, respectively. Also, the NEs 102*a*, 102*b* include optical modules 108*a*, 108*b*, which include optical elements 110*a*, 110*b*, respectively. Again, the optical elements 110*a*, 110*b* may be amplifiers or pairs of amplifiers for bidirectional communication. Furthermore, the optical line system 100 includes multi-rail links 112*a*, 112*b*, 112*c* connected adjacent to the NEs 102*a*, 102*b*. Again, routes through the optical line system 100 may be arranged logically by controlling the optical coupling through the switches 104, 106.

Each group of the multi-rail links 112*a*, 112*b*, 112*c* and optical elements 110*a*, 110*b* includes a relative quality ranking for that group, numbered from 1 to 4. In this embodiment, the optical line system 100 includes four rails in each multi-rail link 112*a*, 112*b*, 112*c* and four optical elements 110*a*, 110*b* in each of the optical modules 108*a*, 108*b*. In FIG. 8, the relative quality ranking for each group is shown. For the sake of simplicity, the relative quality rankings are shown such that the highest quality rank (e.g., "1") is shown at the top and the lowest quality rank (e.g., "4") is shown at the bottom. Thus, when initially set up, the optical line system 100 may align all the #1 ranked rails and components together, all the #2 ranked rails and components together, all the #3 ranked rails and components together, and all the #4 ranked rails and components together.

Figure 9:
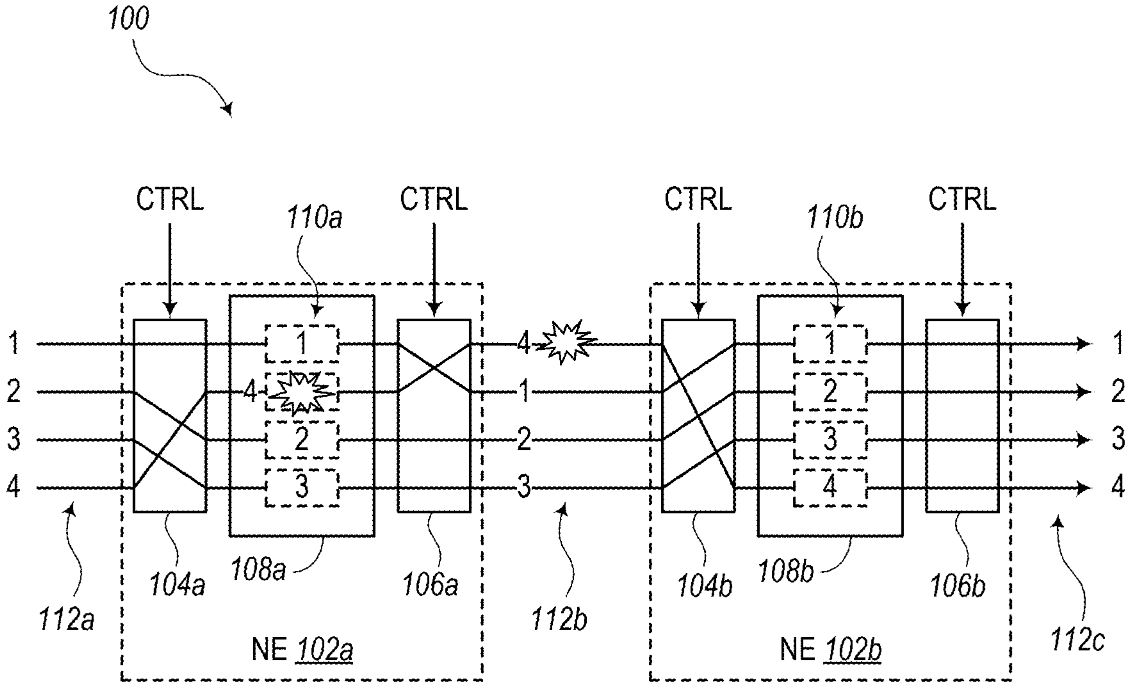
FIG. 9 is a schematic diagram illustrating the portion of the optical line system of FIG. 8 in which switches are reconfigured when multiple faults are detected, according to various embodiments.

FIG. 9 is a schematic diagram illustrating the optical line system 100 of FIG. 8, whereby the switches 104, 106 are reconfigured when multiple faults are detected or when new quality parameters reveal new relative quality rankings. In the example shown in FIG. 9, a component fault (or equipment fault) is detected on the second element of the optical elements 110*a* of the optical module 108*a* of the NE 102*a*. As a result, the relative quality rankings associated with the optical elements 110*a* may then be recalculated as 1, 4, 2, 3 from top to bottom. Also, a line fault (or rail fault) is detected on the first rail of the multi-rail link 112*b*. As a result, the relative quality rankings associated with the rails of the multi-rail link 112*b* may then be recalculated as 4, 1, 2, 3 from top to bottom.

In response to detecting these faults, a control device (not shown) may be configured to provide control (CTRL) signals to the switches that are adjacent to the faulty rails or elements. The switches 104, 106 are switched to redirect routes as needed to reassign the rails and components based on quality parameters. It may be assumed that a fault may represent a lowest quality parameter. In this example, first switch 104*a* may be configured to align the optical elements 110*a* associated with the component fault with the lowest quality route (e.g., having lowest relative quality ranking "4"). The second switch 106*a* has faults on both adjacent portions (e.g., one fault in optical module 108*a* and one fault in multi-rail link 112*b*. Also, first switch 104*b* is reconfigured to maintain the routes with corresponding relative quality rankings.

Furthermore, it is also possible to assign a QoS rating to different operational elements within the paths. For example, each of the fibers in a given section can be compared using a number of different parameters and assigned a relative QoS value. Examples of parameters that can be used in the calculation of relative quality rankings may include insertion loss, Optical Return Loss (ORL), results of Optical Time-Domain Reflectometry (OTDR) test traces, amongst others.

Trend analysis can also be used to identify other metrics based upon changes (e.g., rate of change of insertion loss, insertion loss stability, etc.). Transmission equipment (e.g., ILAs) can also be assessed for relative QoS. In some cases, additional metrics may include pump margin and/or efficiency metrics, such as by using the systems described in U.S. Pat. No. 11,411,365, System-level optical amplifier efficiency performance metric, the contents of which are incorporated by reference. These can also be static or tracked for trend analysis Equipment environment conditions can also be considered in the QoS determination and rail priority. For example, if the voltage to the equipment is such that the required power output cannot be maintained, then this condition can be used to automatically turn off the lowest QoS rail in order to preserve the traffic on the higher QoS rails. In another example, if the temperature of the equipment rises such that performance cannot be maintained for all rails, then this condition can be used to automatically turn off the lowest QoS rail in order to preserve the traffic on the higher QoS rails also Having assigned relative QoS ratings to the equipment in the different physical rails, this can be used to predict the combination with the lowest likelihood of failure, which can then be assigned to the highest QoS logical rail. For example, quality metrics can be based on a prediction of continued quality and reduced risk of failure. This may reduce the risk of a failure hitting the high QoS paths delivering a more resilient network. The QoS ratings can be assessed at initial deployment, but can also be re-assessed during operation during regularly scheduled testing times or maintenance windows and a resilience optimization can be performed when needed.

Control Device

Figure 10:
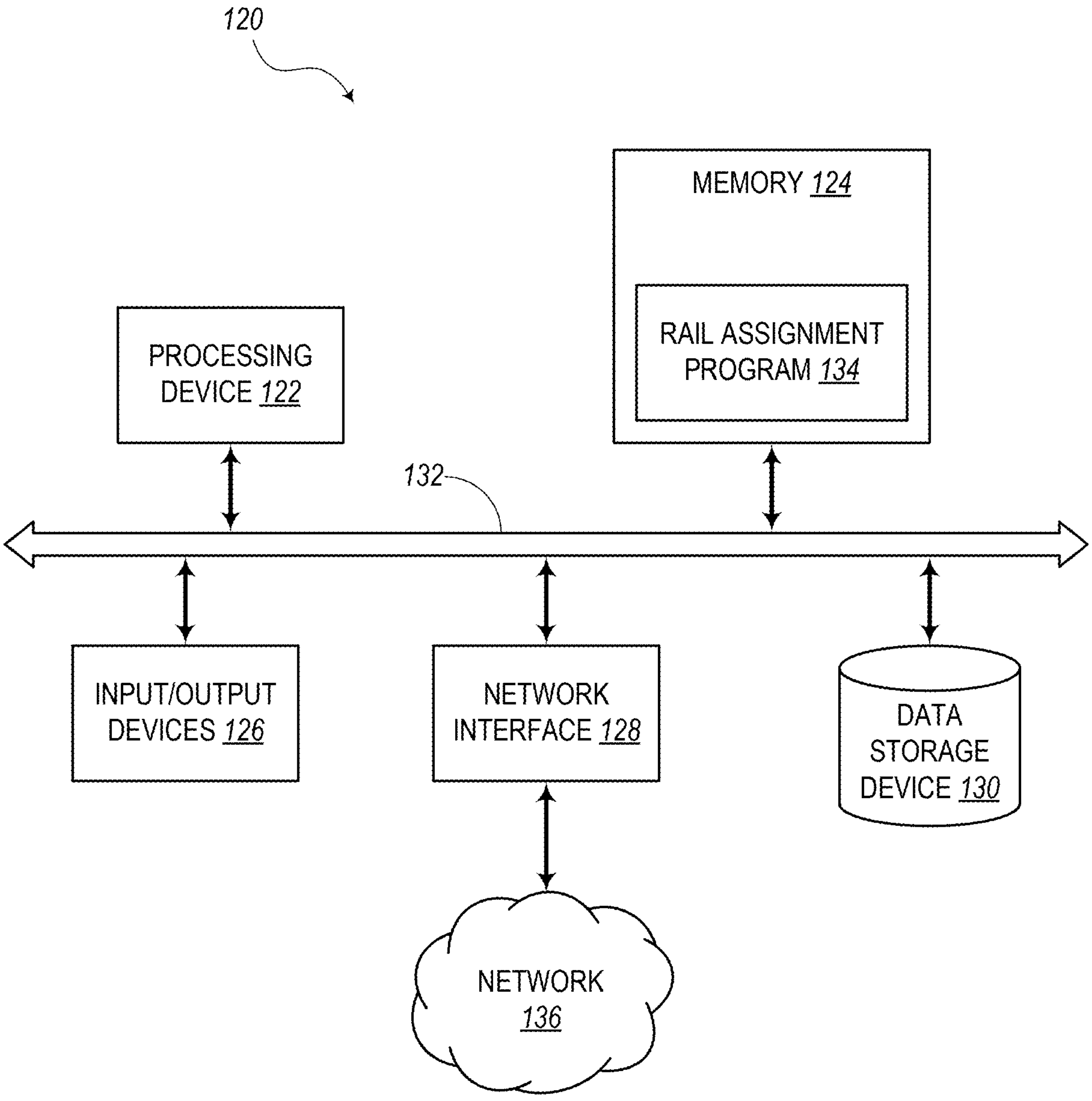
FIG. 10 is a block diagram illustrating a control device for controlling optical switches of an optical line system to reconfigure routes through multiple rails, according to various embodiments.

FIG. 10 is a block diagram illustrating an embodiment of a control device 120 for controlling optical switches of an optical line system to rearrange routes through rails and components based on relative quality parameters at each link or NE. In the illustrated embodiment, the control device 120 may be a digital computing device that generally includes a processing device 122, a memory 124, Input/Output (I/O) devices 126, a network interface 128, and a data storage device 130. It should be appreciated that FIG. 10 depicts the control device 120 in a simplified manner, where some embodiments may include additional components and suitably configured processing logic to support known or conventional operating features. The components (i.e., 122, 124, 126, 128, 130) may be communicatively coupled via a local interface 132. The local interface 132 may include, for example, one or more buses or other wired or wireless connections. The local interface 132 may also include controllers, buffers, caches, drivers, repeaters, receivers, among other elements, to enable communication. Further, the local interface 132 may include address, control, and/or data connections to enable appropriate communications among the components 122, 124, 126, 128, 130.

It should be appreciated that the processing device 122, according to some embodiments, may include or utilize one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), semiconductor-based devices, chips, and the like). The processing device 122 may also include or utilize stored program instructions (e.g., stored in hardware, software, and/or firmware) for control of the control device 120 by executing the program instructions to implement some or all of the functions of the systems and methods described herein. Alternatively, some or all functions may be implemented by a state machine that may not necessarily include stored program instructions, may be implemented in one or more Application Specific Integrated Circuits (ASICs), and/or may include functions that can be implemented as custom logic or circuitry. Of course, a combination of the aforementioned approaches may be used. For some of the embodiments described herein, a corresponding device in hardware (and optionally with software, firmware, and combinations thereof) can be referred to as "circuitry" or "logic" that is "configured to" or "adapted to" perform a set of operations, steps, methods, processes, algorithms, functions, techniques, etc., on digital and/or analog signals as described herein with respect to various embodiments.

The memory 124 may include volatile memory elements (e.g., Random Access Memory (RAM), Dynamic RAM (DRAM), Synchronous DRAM (SDRAM), Static RAM (SRAM), and the like), nonvolatile memory elements (e.g., Read Only Memory (ROM), Programmable ROM (PROM), Erasable PROM (EPROM), Electrically Erasable PROM (EEPROM), hard drive, tape, Compact Disc ROM (CD-ROM), and the like), or combinations thereof. Moreover, the memory 124 may incorporate electronic, magnetic, optical, and/or other types of storage media. The memory 124 may have a distributed architecture, where various components are situated remotely from one another, but can be accessed by the processing device 122.

The memory 124 may include a data store, database (e.g., data storage device 130), or the like, for storing data. In one example, the data store may be located internal to the control device 120 and may include, for example, an internal hard drive connected to the local interface 132 in the control device 120. Additionally, in another embodiment, the data store may be located external to the control device 120 and may include, for example, an external hard drive connected to the I/O devices 126 (e.g., SCSI or USB connection). In a further embodiment, the data store may be connected to the control device 120 through a network and may include, for example, a network attached file server.

Software stored in the memory 124 may include one or more programs, each of which may include an ordered listing of executable instructions for implementing logical functions. The software in the memory 124 may also include a suitable Operating System (O/S) and one or more computer programs. The O/S essentially controls the execution of other computer programs, and provides scheduling, input/output control, file and data management, memory management, and communication control and related services. The computer programs may be configured to implement the various processes, algorithms, methods, techniques, etc. described herein.

Moreover, some embodiments may include non-transitory computer-readable media having instructions stored thereon for programming or enabling a computer, server, processor (e.g., processing device 122), circuit, appliance, device, etc. to perform functions as described herein. Examples of such non-transitory computer-readable medium may include a hard disk, an optical storage device, a magnetic storage device, a ROM, a PROM, an EPROM, an EEPROM, Flash memory, and the like. When stored in the non-transitory computer-readable medium, software can include instructions executable (e.g., by the processing device 122 or other suitable circuitry or logic). For example, when executed, the instructions may cause or enable the processing device 122 to perform a set of operations, steps, methods, processes, algorithms, functions, techniques, etc. as described herein according to various embodiments.

The methods, sequences, steps, techniques, and/or algorithms described in connection with the embodiments disclosed herein may be embodied directly in hardware, in software/firmware modules executed by a processor (e.g., processing device 122), or any suitable combination thereof. Software/firmware modules may reside in the memory 124, memory controllers, Double Data Rate (DDR) memory, RAM, flash memory, ROM, PROM, EPROM, EEPROM, registers, hard disks, removable disks, CD-ROMs, or any other suitable storage medium.

Those skilled in the pertinent art will appreciate that various embodiments may be described in terms of logical blocks, modules, circuits, algorithms, steps, and sequences of actions, which may be performed or otherwise controlled with a general purpose processor, a DSP, an ASIC, an FPGA, programmable logic devices, discrete gates, transistor logic, discrete hardware components, elements associated with a computing device, controller, state machine, or any suitable combination thereof designed to perform or otherwise control the functions described herein.

The I/O devices 126 may be used to receive user input from and/or for providing system output to one or more devices or components. For example, user input may be received via one or more of a keyboard, a keypad, a touchpad, a mouse, and/or other input receiving devices. System outputs may be provided via a display device, monitor, User Interface (UI), Graphical User Interface (GUI), a printer, and/or other user output devices. The I/O devices 126 may include, for example, one or more of a serial port, a parallel port, a Small Computer System Interface (SCSI), an Internet SCSI (ISCSI), an Advanced Technology Attachment (ATA), a Serial ATA (SATA), a fiber channel, InfiniBand, a Peripheral Component Interconnect (PCI), a PCI extended interface (PCI-X), a PCI Express interface (PCIe), an InfraRed (IR) interface, a Radio Frequency (RF) interface, and a Universal Serial Bus (USB) interface.

The network interface 128 may be used to enable the control device 120 to communicate over a network (e.g., control layer of a multi-rail or SDM optical network), the Internet, a Wide Area Network (WAN), a Local Area Network (LAN), and the like, for providing control signals to various switches used in a multi-rail system. The network interface 128 may include, for example, an Ethernet card or adapter (e.g., 10BaseT, Fast Ethernet, Gigabit Ethernet, 10 GbE) or a Wireless LAN (WLAN) card or adapter (e.g., 802.11a/b/g/n/ac). The network interface 128 may include address, control, and/or data connections to enable appropriate communications on the network.

In some embodiments, the control device 120 includes a rail assignment program 134, which may be implemented in any suitable combination of hardware and/or software. The rail assignment program 134 may include computer logic or code having instructions that enables or causes the processing device 122 to perform various steps in processes for assigning or reassigning routes throughout an optical line system having multiple rails to set and prioritize the rails and equipment at each node or fiber span and aligns the pieces with the same or similar relative quality metrics to thereby maintain consistent quality, from high to low, across the optical network.

Therefore, according to various embodiments of the present disclosure, a control device (e.g., control device 120) may include a processing device and memory configured to store a rail assignment program having instructions that, when executed, enable the processing device to perform certain functions. For example, the rail assignment program may include instructions enabling the processing device to receive a first set of quality parameters pertaining to rails of a first multi-rail path in a Space-Division Multiplexing (SDM) optical network. Also, the processing device may be configured to determine a first set of rankings for prioritizing the rails of the first multi-rail path from highest to lowest based on the first set of quality parameters. The instructions may also enable the processing device to receive a second set of quality parameters pertaining to optical components of an SDM Network Element (NE) arranged adjacent to the first multi-rail path in the SDM optical network. Also, the processing device may be configured to determine a second set of rankings for prioritizing the optical components of the SDM NE from highest to lowest based on the second set of quality parameters. Next, the processing device can provide control signals to a first programmable switch connected at an interface between the first multi-rail path and the SDM NE to align the rails with the optical components based on the first and second sets of rankings from highest to lowest.

According to some embodiments, the instructions may further enable the processing device to a) receive a third set of quality parameters pertaining to rails of a second multi-rail path arranged adjacent to the optical components of the SDM NE in the SDM optical network, b) determine a third set of rankings for prioritizing the rails of the second multi-rail path from highest to lowest based on the third set of quality parameters, and c) provide control signals to a second programmable switch connected at an interface between the second multi-rail path and the SDM NE to align the rails of the second multi-rail path with the optical components based on the second and third sets of rankings from highest to lowest.

Furthermore, the instructions may further enable the processing device to a) receive additional sets of quality parameters pertaining to additional rails of additional multi-rail paths in the SDM optical network and additional optical components of additional SDM NEs in the SDM optical network, and b) provide additional control signals to additional programmable switches connected to west and east interfaces of the additional SDM NEs to align rails and optical components according to additional rankings associated each respective additional set of quality parameters from highest to lowest. The actions of providing the control signals and additional control signals may be configured to establish a highest priority route through the SDM optical network, a second highest priority route through the SDM optical network, a third highest priority route through the SDM optical network, and so on.

In addition, the instructions may further enable the processing device to a) determine presence of one or more faults in one or more rails or optical components based on the quality parameters, and b) align the one or more faults with a lowest priority sacrificial route through the SDM optical network for soft-fail performance, wherein the lowest priority sacrificial route is unused for optical transmission until the one or more faults are resolved. In some embodiments, the instructions may further enable the processing device to a) receive updated quality parameters for the multi-rail path and SDM NE during regularly scheduled testing and/or during maintenance windows, b) update the rankings of the rails and optical components, and c) dynamically reconfigure the first programmable switch by realigning the rails and optical components based on the updated rankings from highest to lowest.

Process for Configuring and Reconfiguring Routes Through Multi-Rail System

Figure 11:
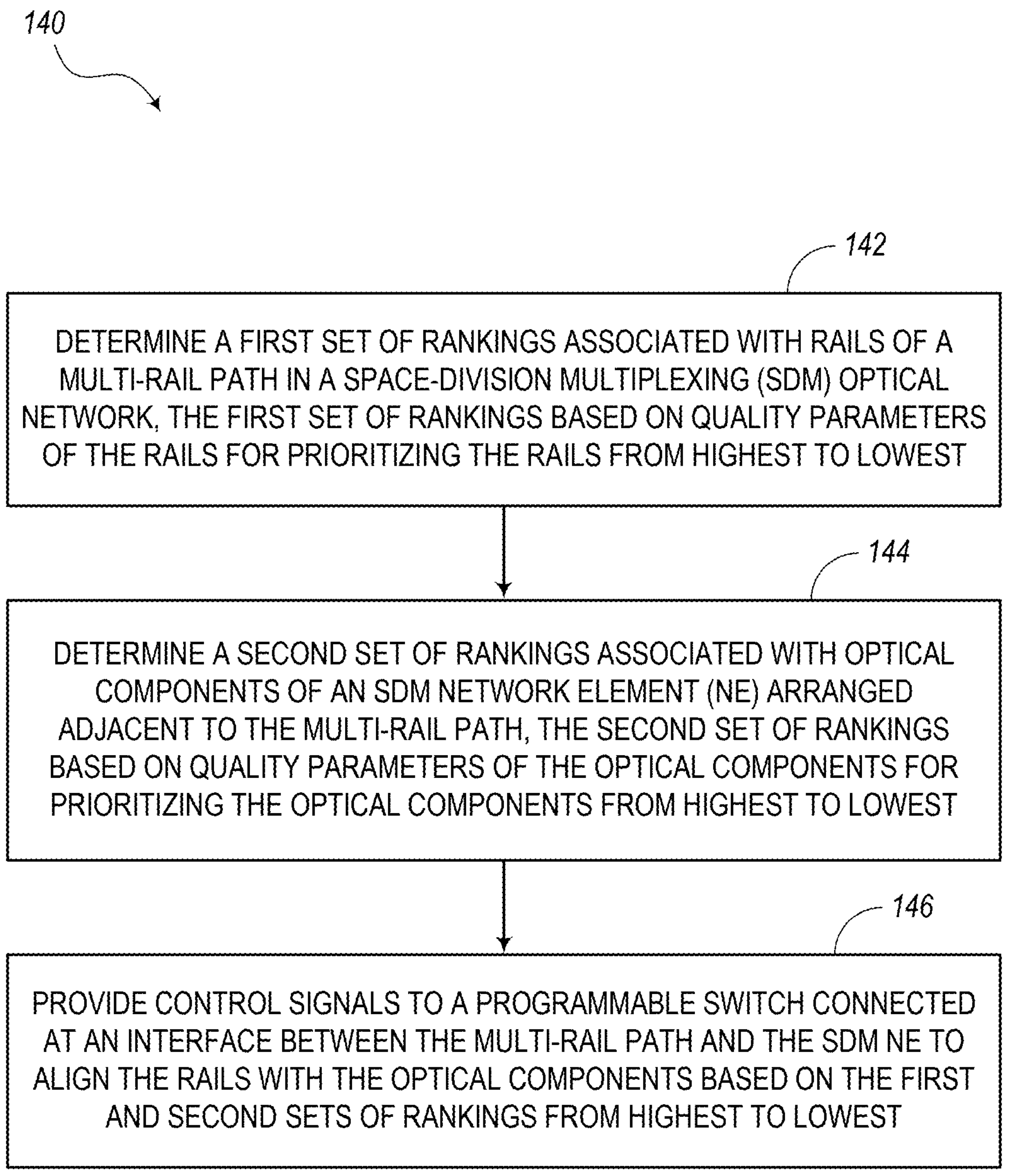
FIG. 11 is a flow diagram illustrating a method for configuring or reconfiguring routes through a multiple-rail optical line system, according to various embodiments.

FIG. 11 is a flow diagram illustrating an embodiment of a process 140 for configuring routes through a multiple-rail optical line system. As shown, the process 140 includes a step of determining a first set of rankings associated with rails of a multi-rail path in a Space-Division Multiplexing (SDM) optical network, as indicated in block 142. For example, the first set of rankings may be based on quality parameters of the rails for prioritizing the rails from highest to lowest. Next, the process 140 includes a step of determining a second set of rankings associated with optical components of an SDM Network Element (NE) arranged adjacent to the multi-rail path, as indicated in block 144. For example, the second set of rankings may be based on quality parameters of the optical components for prioritizing the optical components from highest to lowest. The process 140 further includes a step of providing control signals to a first programmable switch connected at an interface between the multi-rail path and the SDM NE to align the rails with the optical components based on the first and second sets of rankings from highest to lowest, as indicated in block 146.

According to some embodiments, the first programmable switch may be arranged at a west degree of the SDM NE, wherein the process 140 may further include as step of determining a third set of rankings associated with rails of a second multi-rail path arranged adjacent to the SDM NE. The process 140 may also include a step of providing control signals to a second programmable switch connected at an interface between the SDM NE and the second multi-rail path arranged at an east degree of the SDM NE to enable the second programmable switch to align the rails of the second multi-rail path with the optical components based on the second and third sets of rankings from highest to lowest.

Furthermore, according to some embodiments, the quality parameters may be defined by a) a Quality of Service (QoS) metric, b) a Quality of Experience (QoE) metric, c) insertion loss, d) Optical Return Loss (ORL), e) results of an Optical Time-Domain Reflectometry (OTDR) test, f) a risk of failure metric, g) Signal-to-Noise Ratio (SNR), h) latency, i) noise, j) jitter, k) a phase offset metric, l) pump margin, m) an efficiency metric, and/or n) a trend analysis.

Quality metrics, QoS metrics, etc. may be used for defining relative priorities at each respective node or fiber span. In some cases, QoS may be a proxy for availability that can be used to determine the preferred configuration of assignment of logical rails to physical rails in order to deliver higher QoS to some logical rails compared to others. When spontaneous failures occur (and are detected by monitoring devices), the QoS metrics can ensure that the failed elements or fibers are assigned to the logical rail with the lowest QoS.

This method automatically assigns multiple failures to the same logical rail, maximizing the available transport capacity and yielding a "soft-fail" behavior to the multi-rail network. The systems may be compatible with predictive failure analysis to assign QoS ratings to equipment and fibers that further minimize the failure risk for the highest QoS logical rails.

The systems and methods may be extensible to N×M switching where redundant equipment or paths are available to provide (M−N):N protection. This has been illustrated using in-line amplifiers but applies equally to all multi-rail line interfaces. Some of the characteristics of this rail assignment are similar to that of optical protection switches, but these typically provide a 1×N type protection, rather than the more flexible N×N (or N×M) assignment as described in the present disclosure.

The novelty of the present disclosure may reside in the technological area of multi-rail transmission equipment in high-capacity networks. Some similar concepts have been applied on protected optical networks where, for example, 1+1 protection can also provide resilience to multiple failures. However, in those networks the protection is constructed as working and standby protect, such that the initial capacity of the network is not doubled. In the multi-rail environment, initially all of the equipment is operational resulting in NX capacity for a multi-rail network. The novelty of the QoS rail assignment described herein is that it allows full capacity when all the equipment is operating normally (e.g., does not require dedicated standby equipment) and can be used to maximize the network capacity in the event of multiple failures. Furthermore, the assignment of physical rail equipment based upon relative QoS allows the QoS of the logical rails to be biased to minimize traffic hits for the highest priority traffic. As N increases, the fractional capacity impact is reduced ((N−1)/N), further increasing the value of muti-rail networks.

This provides an advantageous soft-fail characteristic to massive multi-rail networks and provides an effective mitigation to the capacity reduction in the presence of failures. Due to the volume of equipment in multi-rail networks, the failure rate will be typically higher than today's systems and the criticality of failure is even more important for these ultra-high capacity networks.

Since the capacity on a single fiber is somewhat limited, focus of trying to increase capacity of a single fiber has been redirected to SDM systems or multi-rail systems to thereby build out in parallel. SDM may include adding physical fibers, rather than wavelengths or channels. Thus, the embodiments herein are configured to manage multiple fibers in one system.

Network Element

In an embodiment, a network element 32, 50, 60, 90, 102 in a Space Division Multiplexed (SDM) optical network includes a first switch 34, 52, 62, 92, 104 connected to a plurality of rails 42, 72, 112 in a west direction relative to the network element; a second switch 36, 52, 62, 92, 106, connected to the plurality of rails in an east direction relative to the network element; and a plurality of optical components, such as the amplifiers 40, 56, 58, located between and connected to the first switch and the second switch, each optical component supporting a rail of the plurality of rails where each rail includes a fiber path being amplified in the SDM optical network, wherein each of the first switch and the second switch are configured to selectively switch individual rails of the plurality of rails to different optical components of the plurality of optical components. That is, the rail is a logical construct representing a fiber path through the network, e.g., via a single fiber, a core in a fiber, a mode in a multimode fiber, etc. The switches allow the physical path to change, i.e., a given rail no longer has to be straight on the same fiber path, it can change paths between optical network elements. Note, the optical components can be amplifiers, such as EDFAs, regenerators, express through ports, etc. That is, while generally described herein as an amplifier for each rail, those skilled in the art will recognize it can be generally described as an optical component which can include an amplifier as well as other types of components, e.g., regenerators, express through ports, etc.

In an embodiment, the selectively switch is based on a Quality of Service (QoS) such that a lower priority rail is preempted or placed on a lower quality amplifier of the plurality of amplifiers, and wherein each of the plurality of rails is assigned a QoS rating and the selectively switch is based thereon. The QoS rating can be determined based on any of fiber parameters, transmission equipment parameters, and environmental parameters. In another embodiment, the selectively switch is based on a failure at another network element in the SDM optical network such that a first rail that is already failed at the another network element is used by a second rail that has failed at the optical network element. In a further embodiment, the selectively switch is based on a failure of another rail at another location in the SDM optical network such that a lower priority rail is preempted for a higher priority rail.

The first switch and the second switch can each be an N×N switch, N being an integer equal to a number of rails of the plurality of rails. The first switch and the second switch can also each be an N×N switch, N being an integer greater than a number of rails of the plurality of rails. The network element can include one or more backup amplifiers connected to the first switch and the second switch and each used to protect any of the plurality of amplifiers upon failure thereof. The one or more backup amplifiers can be powered off until needed. The first switch and the second switch can be configured such that all inputs to the optical amplifier network element are on the first switch and all outputs are on the second switch. The first switch and the second switch can be configured to support loopbacks on individual rails of the plurality of rails.

The plurality of amplifiers can be in a single, integrated module supporting all of the plurality of rails. The first switch and the second switch can be in a separate module from the single, integrated module. The network element can include a second single, integrated module supporting a second plurality of amplifiers, connected to the separate module, and used to protect the single, integrated module in case on a failure affecting the entire single, integrated module. Each rail of the plurality of rails can support between 4800 and 9600 GHz of spectrum capacity in the C and/or C+L band, but again, other ranges are also contemplated.

FIG. 12 is a flow diagram illustrating an embodiment of a process 150 for operating a network element in a Space Division Multiplexed (SDM) optical network. As shown, the process 150 includes a step of operating a plurality of rails in a west direction and an east direction, each relative to the network element, wherein the network element is configured to amplify each rail of the plurality of rails via a plurality of amplifier, as indicated in block 152. The process 150 further includes a step of selectively switching individual rails of the plurality of rails to different amplifiers of the plurality of amplifiers, thereby separating a physical path of the plurality of rails from a logical path, as indicated in block 154.

In an embodiment, the selectively switching is based on a Quality of Service (QoS) such that a lower priority rail is preempted or placed on a lower quality amplifier of the plurality of amplifiers, and wherein each of the plurality of rails is assigned a QoS rating and the selectively switch is based thereon. In another embodiment, the selectively switching is based on a failure at another network element in the SDM optical network such that a first rail that is already failed at the another network element is used by a second rail that has failed at the optical network element. In a further embodiment, the selectively switching is based on a failure of another rail at another location in the SDM optical network such that a lower priority rail is preempted for a higher priority rail.

Amplifier Module

In a further embodiment, the present disclosure includes an amplifier module for use in a network element in a Space Division Multiplexed (SDM) optical network. The amplifier module includes a plurality of west ports connected to a plurality of rails in a west direction relative to the network element, the plurality of west ports each connected to a first switch; a plurality of east ports connected to the plurality of rails in an east direction relative to the network element, the plurality of east ports each connected to a second switch; and a plurality of amplifiers, located between the plurality of west ports and the plurality of east ports, each amplifier supporting a rail of the plurality of rails where each rail includes a fiber path being amplified in the SDM optical network, wherein each of the first switch and the second switch are configured to selectively switch individual rails of the plurality of rails to different amplifiers of the plurality of amplifiers, thereby separating a physical path of the plurality of rails from a logical path.

The west ports and the east ports can be exposed on a faceplate of the amplifier module, and the amplifies can be connected internally inside a housing of the amplifier module, with the housing including the faceplate. In an embodiment, the switches can be located external from the housing, such as to support redundancy both at the port level and at the module level, e.g., switching individual ports on the same amplifier module versus switching all ports of the same amplifier module to another amplifier module. In another embodiment, the switches can be located internal to the housing between the ports and the amplifiers. This approach allows redundancy at the port level.

SDM as a Serial and Parallel Components

Figure 13A:
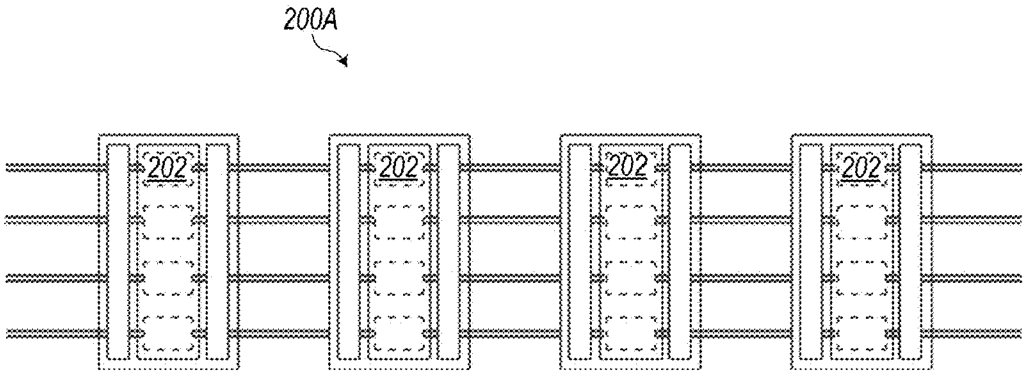
FIG. 13A is a schematic of an SDM optical line system with an equal number of ILAs along the entire path.
Figure 13B:
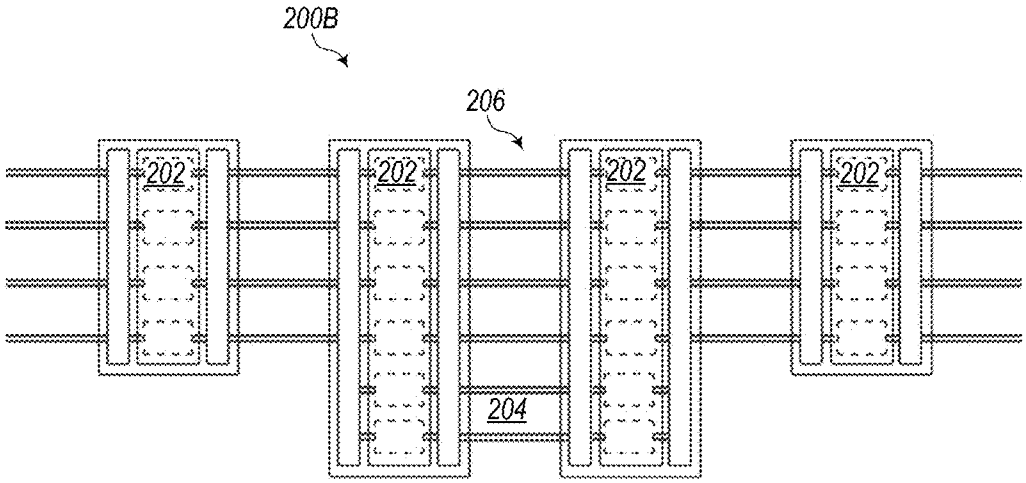
FIG. 13B is a schematic of an SDM optical line system with an unequal number of ILAs along the entire path as well as additional fiber rails on one section.
Figure 13C:
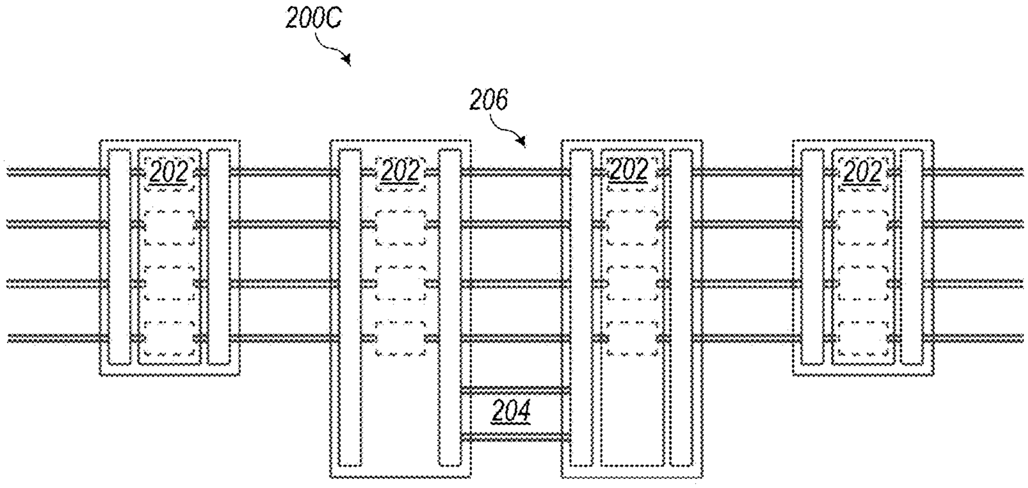
FIG. 13C is a schematic of an SDM optical line system with an equal number of ILAs along the entire path along with additional fibers rails on one section.
Figure 13D:
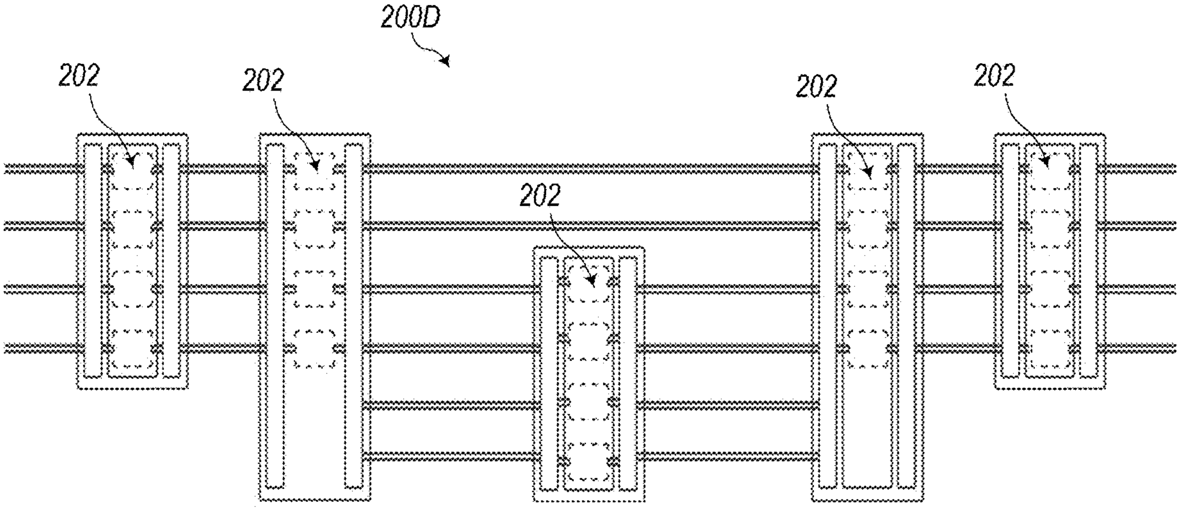
FIG. 13D is a schematic of an SDM optical line system with non-equal equipment.
Figure 13E:
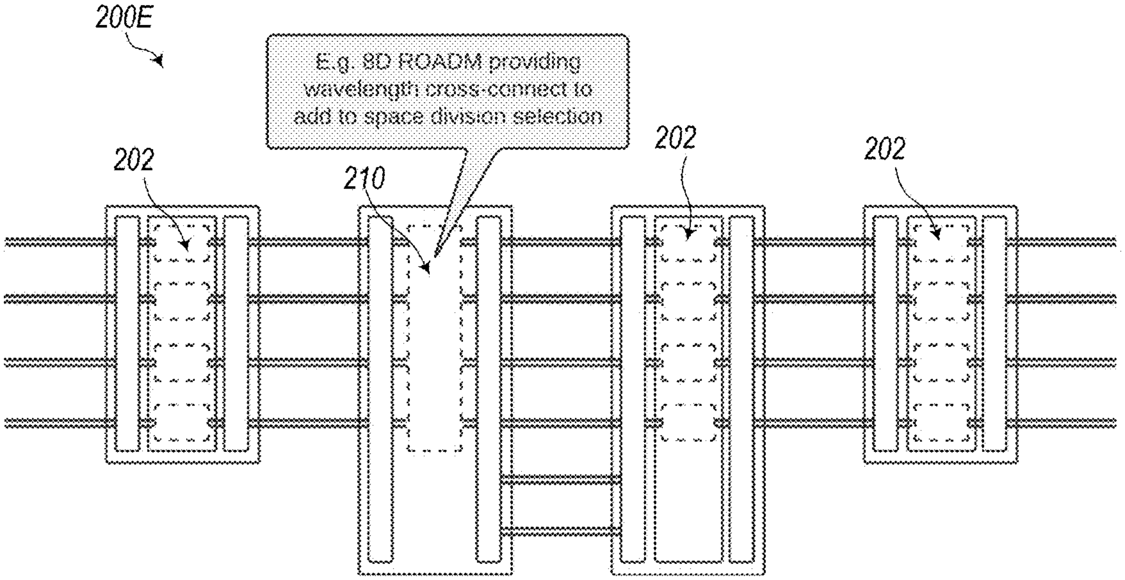
FIG. 13E is a schematic of an SDM optical line system substituting a ROADM at one of the ILA sites for providing wavelength granularity of routing as well as space division.

FIGS. 13A-13E are schematic diagrams illustrating an SDM optical line system using multiple bi-directional rails, according to various embodiments, for illustrating management and operation of an SDM system as a combination of serial and parallel components. FIG. 13A is a schematic of an SDM optical line system 200A with an equal number of ILAs 202 along the entire path. FIG. 13B is a schematic of an SDM optical line system 200B with an unequal number of ILAs 202 along the entire path as well as additional fiber rails 204 on one section 206. FIG. 13C is a schematic of an SDM optical line system 200C with an equal number of ILAs 202 along the entire path along with additional fibers rails 204 on one section 206. FIG. 13D is a schematic of an SDM optical line system 200D with non-equal equipment. FIG. 13E is a schematic of an SDM optical line system 200E substituting a ROADM 210 at one of the ILA sites for providing wavelength granularity of routing as well as space division.

Those skilled in the art will recognize FIGS. 13A-13E illustrate some examples of the SDM optical line system and other variations are possible and contemplated herewith. In particular, one aspect of the present disclosure is an SDM optical line system 200 can broadly be conceptualized as a system composed of serial and parallel components. To that end, a viable working system fraction must be components of a single, complete "serial" path through the SDM optical line system 200, but each individual subsegments can be selected from any of the working "parallel" subsegments.

Specifically, the parallel components can be fibers (rails), the ILAs 202, ROADM components, regenerators, etc. Path computation in the SDM optical line system becomes a process of selecting individual parallel components along the way such that the selection of individual parallel components forms a complete, serial path and such that, once a component is selected, it is unavailable to be selected by another rail, unless this is for preemption.

Thus, the present disclosure can include the hardware and associated architecture for stitching paths together via switches or via parts of existing ROADMs, as well as a process for stitching a complete working serial path based on some specified policies. For example, maybe there are two failures with one on high-capacity segment and one on low-capacity one. Then, high-capacity path may be preferentially restored stealing a working segment from low-capacity one. Of note, we have multiple paths from whom both the route is selected AND this is based upon relative path/rail priority, then we have a generic solution to prioritize some paths above others.

FIGS. 13A-13E illustrate some example, non-limiting, SDM optical line systems for describing possible parallel components. In FIG. 13A, there are an equal number of ILAs 202 for rails, so the path computation can be selecting an ILA 202 and corresponding rail for each SDM service. There are four rails and four ILAs 202, so four SDM services can be supported, and each one can use a different rail and ILA 202.

In FIG. 13B, there is the extra rail 204 on the section 206. Here, if there is a fiber cut or equipment failure on the segment 206 for a given rail 204, there is a standby rails 204 that can be used for resiliency. In FIG. 13C, there is an extra rail 204, but not extra ILAs 202, so there can be resiliency for a fiber cut on the section 206.

In FIG. 13D, there is non-equal equipment. Here, one of the rails does not have ILAs 202 whereas a backup rail is also included. This is presented to show there can be any variant of the parallel components. Finally, in FIG. 13E, an ILA site is replaced with the ROADM 210, to enable wavelength cross-connect granularity.

Path Computation Process

Figure 14:
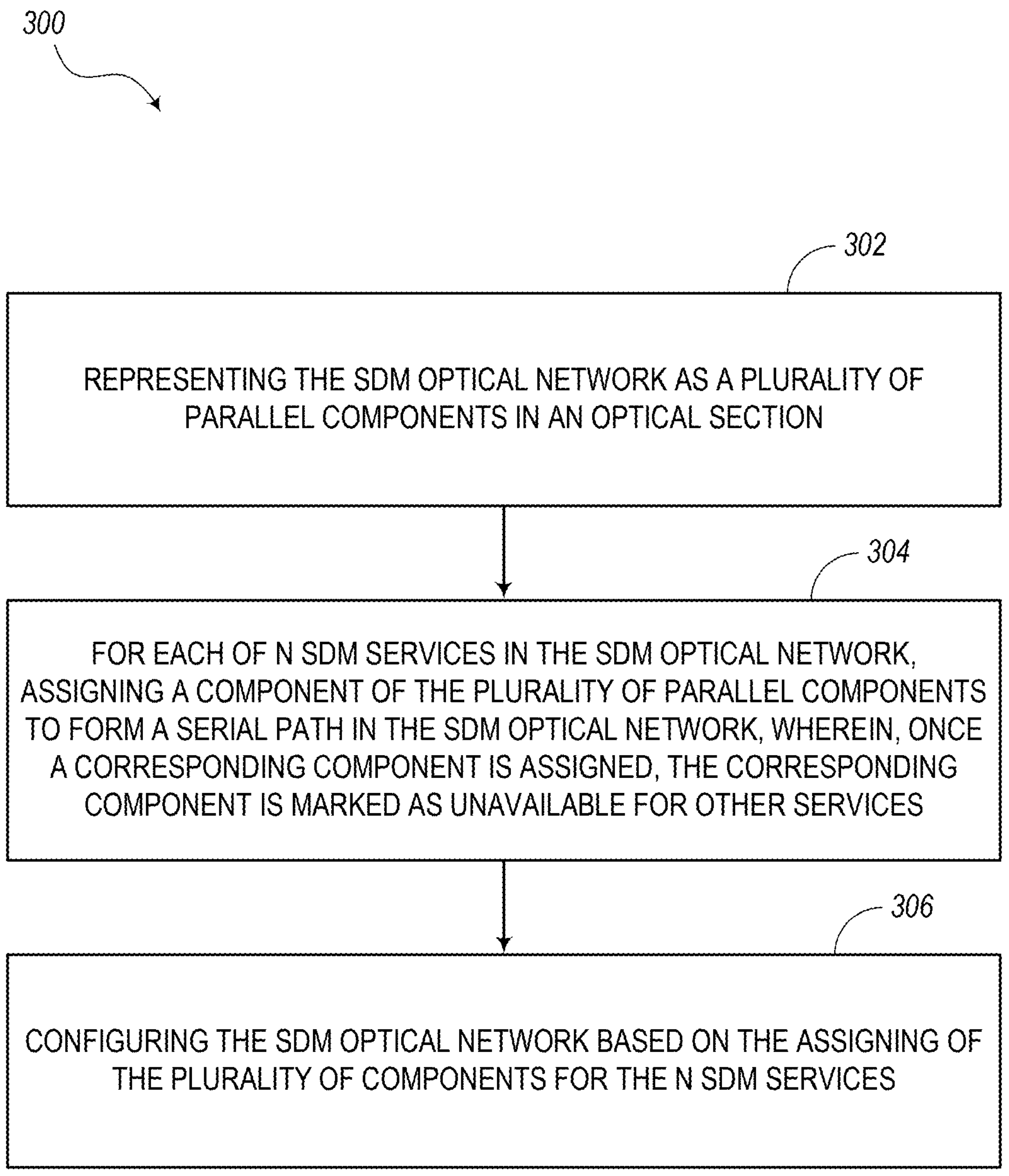
FIG. 14 is a flow diagram illustrating an embodiment of a process for path computation in a Space Division Multiplexed (SDM) optical network.

FIG. 14 is a flow diagram illustrating an embodiment of a process 300 for path computation in a Space Division Multiplexed (SDM) optical network. The process 300 contemplates implementation by a management system, a Software Defined Networking (SDN) controller, a Path Computation Element (PCE), a planning system, and the like. The process 300 includes representing the SDM optical network as a plurality of parallel components in an optical section (step 302); for each of N SDM services in the SDM optical network, assigning a component of the plurality of parallel components to form a serial path in the SDM optical network, wherein, once a corresponding component is assigned, the corresponding component is marked as unavailable for other services (step 304), and configuring the SDM optical network based on the assigning of the plurality of components for the N SDM services (step 306).

That is, with the approach and architecture described herein, path computation in an SDM optical network becomes selecting components to form a serial link.

Conclusion

As used herein, including in the claims, the phrases "at least one of" or "one or more of" a list of items refer to any combination of those items, including single members. For example, "at least one of: A, B, or C" covers the possibilities of: A only, B only, C only, a combination of A and B, a combination of A and C, a combination of B and C, and a combination of A, B, and C. Additionally, the terms "comprise," "comprises," "comprising," "include," "includes," and "including" are intended to be non-limiting and open-ended. These terms specify essential elements or steps but do not exclude additional elements or steps, even when a claim or series of claims includes more than one of these terms.

While the present disclosure has been detailed and depicted through specific embodiments and examples, it is to be understood by those skilled in the art that numerous variations and modifications can perform equivalent functions or yield comparable results. Such alternative embodiments and variations, which may not be explicitly mentioned but achieve the objectives and adhere to the principles disclosed herein, fall within its spirit and scope. Accordingly, they are envisioned and encompassed by this disclosure, warranting protection under the claims associated herewith. That is, the present disclosure anticipates combinations and permutations of the described elements, operations, steps, methods, processes, algorithms, functions, techniques, modules, circuits, etc., in any manner conceivable, whether collectively, in subsets, or individually, further broadening the ambit of potential embodiments.

Although operations, steps, instructions, and the like are shown in the drawings in a particular order, this does not imply that they must be performed in that specific sequence or that all depicted operations are necessary to achieve desirable results. The drawings may schematically represent example processes as flowcharts or flow diagrams, but additional operations not depicted can be incorporated. For instance, extra operations can occur before, after, simultaneously with, or between any of the illustrated steps. In some cases, multitasking and parallel processing are contemplated. Furthermore, the separation of system components described should not be interpreted as mandatory for all implementations, as the components and systems can be integrated into a single software product or distributed across multiple software products.

What is claimed is:

1. A network element in a Space Division Multiplexed (SDM) optical network, the network element comprising:

a first switch connected to a plurality of rails in a west direction relative to the network element;

a second switch connected to the plurality of rails in an east direction relative to the network element; and a plurality of optical components, located between and connected to the first switch and the second switch, each optical component including an optical amplifier configured to amplify a respective rail of the plurality of rails between the first switch and the second switch in the SDM optical network, wherein each of the first switch and the second switch are configured to selectively switch individual rails of the plurality of rails to different optical components of the plurality of optical components.

2. The network element of claim 1, wherein the selectively switch is based on a Quality of Service (QoS) rating such that a lower priority rail is preempted or placed on a lower quality optical component of the plurality of optical components, and wherein each of the plurality of rails is assigned the QoS rating and the selectively switch is based thereon.

3. The network element of claim 2, wherein the QoS rating is determined based on any of fiber parameters, transmission equipment parameters, and environmental parameters.

4. The network element of claim 1, wherein the selectively switch is based on a failure at another network element in the SDM optical network such that a first rail that is already failed at the another network element is used by a second rail that has failed at the optical network element.

5. The network element of claim 1, wherein the selectively switch is based on a failure of another rail at another location in the SDM optical network such that a lower priority rail is preempted for a higher priority rail.

6. The network element of claim 1, wherein the first switch and the second switch each support N ports, N being an integer equal to a number of rails of the plurality of rails.

7. The network element of claim 1, wherein the first switch and the second switch each support N ports, N being an integer greater than a number of rails of the plurality of rails.

8. The network element of claim 7, further comprising one or more backup optical components connected to the first switch and the second switch and each used to protect any of the plurality of optical components upon failure thereof.

9. The network element of claim 8, wherein the one or more backup optical components are powered off until needed.

10. The network element of claim 1, wherein the first switch and the second switch are configured such that all inputs to the optical amplifier network element are on the first switch and all outputs are on the second switch.

11. The network element of claim 10, wherein the first switch and the second switch are configured to support loopbacks on individual rails of the plurality of rails.

12. The network element of claim 1, wherein the plurality of optical components are in a single, integrated module of the network element, the single, integrated module supporting all of the plurality of rails such that the plurality of optical components share at least one of physical packaging and control within the single, integrated module.

13. The network element of claim 12, wherein the first switch and the second switch are in a separate module from the single, integrated module.

14. The network element of claim 13, further comprising a second single, integrated module supporting a second plurality of optical components, connected to the separate module, and used to protect the single, integrated module in case on a failure affecting the single, integrated module.

15. The network element of claim 1, wherein each component of the plurality of optical components are an optical amplifier.

16. A method implemented in a network element in a Space Division Multiplexed (SDM) optical network, the method comprising steps of operating a plurality of rails in a west direction and an east direction, each relative to the network element, wherein the network element is configured to amplify each rail of the plurality of rails via a plurality of optical components, each optical component including an optical amplifier that amplifies a respective rail of the plurality of rails within the network element; and selectively switching individual rails of the plurality of rails to different optical components of the plurality of optical components.

17. The method of claim 16, wherein the selectively switching is based on a Quality of Service (QoS) such that a lower priority rail is preempted or placed on a lower quality optical component of the plurality of optical components, and wherein each of the plurality of rails is assigned a QoS rating and the selectively switch is based thereon.

18. The method of claim 16, wherein the selectively switching is based on a failure at another network element in the SDM optical network such that a first rail that is already failed at the another network element is used by a second rail that has failed at the optical network element.

19. The method of claim 16, wherein the selectively switching is based on a failure of another rail at another location in the SDM optical network such that a lower priority rail is preempted for a higher priority rail.

20. An amplifier module for use in a network element in a Space Division Multiplexed (SDM) optical network, the amplifier module comprising:

a plurality of west ports connected to a plurality of rails in a west direction relative to the network element, the plurality of west ports each connected to a first switch;

a plurality of east ports connected to the plurality of rails in an east direction relative to the network element, the plurality of east ports each connected to a second switch; and a plurality of amplifiers, located between the plurality of west ports and the plurality of east ports, each amplifier configured to amplify a respective rail of the plurality of rails between a respective west port of the plurality of west ports and a respective east port of the plurality of east ports in the SDM optical network, wherein each of the first switch and the second switch are configured to selectively switch individual rails of the plurality of rails to different amplifiers of the plurality of amplifiers.

* * * * *